United States Patent
Shobe et al.

(10) Patent No.: US 12,380,315 B1
(45) Date of Patent: Aug. 5, 2025

(54) PROVIDING CONTEXTUALIZED LARGE LANGUAGE MODEL RECOMMENDATIONS

(71) Applicant: Dropbox, Inc., San Francisco, CA (US)

(72) Inventors: Eric Shobe, Kihei, HI (US);
Tsung-Hsiang Chang, Bellevue, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/883,646

(22) Filed: Sep. 12, 2024

(51) Int. Cl.
*G06N 3/042* (2023.01)

(52) U.S. Cl.
CPC .................................. *G06N 3/042* (2023.01)

(58) Field of Classification Search
CPC ....................................................... G06N 3/042
USPC ......................................................... 709/217
See application file for complete search history.

(56) References Cited

U.S. PATENT DOCUMENTS

| | | | |
|---|---|---|---|
| 11,983,553 B2 | 5/2024 | Bent, III et al. | |
| 12,033,050 B1 * | 7/2024 | Mancuso | G06N 3/045 |
| 12,135,937 B1 * | 11/2024 | Mancuso | G06F 40/20 |
| 2023/0053063 A1 * | 2/2023 | Dai | G06F 16/9024 |
| 2023/0059367 A1 | 2/2023 | Lai et al. | |
| 2023/0082553 A1 * | 3/2023 | Mendell | G06F 21/604 |
| | | | 707/737 |
| 2024/0356884 A1 * | 10/2024 | Bouguerra | H04L 51/04 |
| 2024/0403086 A1 * | 12/2024 | Mancuso | G06N 3/042 |
| 2024/0403366 A1 * | 12/2024 | Mancuso | G06F 16/9024 |
| 2025/0111148 A1 * | 4/2025 | Namasivayam | G06F 40/20 |

FOREIGN PATENT DOCUMENTS

| | | | | |
|---|---|---|---|---|
| CN | 116662508 A | | 8/2023 | |
| CN | 110998717 B | * | 10/2023 | ........... G10L 15/005 |
| CN | 116932733 A | | 10/2023 | |
| CN | 117850952 A | | 4/2024 | |
| CN | 117935788 A | | 4/2024 | |
| CN | 117951390 A | | 4/2024 | |
| CN | 118428336 A | * | 8/2024 | |

(Continued)

OTHER PUBLICATIONS

English translation of CN-118428336-A (Year: 2024).*

(Continued)

*Primary Examiner* — David P Zarka
(74) *Attorney, Agent, or Firm* — Keller Preece PLLC

(57) ABSTRACT

This disclosure describes systems that identify one or more models (e.g., large language models and/or virtual assistants) permitted to access content items stored for user accounts within a content management system. The disclosed systems can determine a model available to a user account within the content management system from among the one or more models. For example, the disclosed systems can determine one or more relationships between the user accounts within the content management system, large language models utilized by the user accounts, virtual assistants utilized by the user accounts, and content items accessed by the user accounts. The disclosed systems can determine the model for the user account according to the one or more relationships. The disclosed systems can provide a notification corresponding to the model via a user interface of a client device associated with the user account.

20 Claims, 17 Drawing Sheets

(56) References Cited

FOREIGN PATENT DOCUMENTS

WO      2024059334 A1     3/2024

OTHER PUBLICATIONS

Dropbox AI., "Dropbox AI: ChatGPT," Toolify.ai, Jan. 2, 2024, 15 pages, Retrieved from the Internet URL: https://www.toolify.ai/tw/ai-news-tw/dropbox-aichatgpt%E5%8A%A9%E6%82%A8%E7%AE%A1%E7%90%86%E6%96%87%E4%BB%B6-%E4%BB%A5%E5%8F%8A%E6%82%A8%E7%9A%84%E5%BA%94%E7%94%A8%E7%A8%8B%E5%BA%8F-284898.

Li Y., et al., "Personal LLM Agents: Insights and Survey about the Capability, Efficiency and Security," arXiv:2401.05459v2 [cs. HC], May 8, 2024, 62 pages, Retrieved from the Internet URL: https://arxiv.org/abs/2401.05459.

Ullah I., et al., "Privacy Preserving Large Language Models: ChatGPT Case Study Based Vision and Framework," arXiv:2310.12523v1 [cs.CR], Oct. 19, 2023, 18 pages, Retrieved from the Internet URL: https://arxiv.org/abs/2310.12523.

Zhang J., et al., "Prospect Personalized Recommendation on Large Language Model-based Agent Platform," arXiv:2402.18240v2 [cs. IR], Mar. 5, 2024, 11 pages, Retrieved from the Internet URL: https://arxiv.org/html/2402.18240v2.

\* cited by examiner

PROVIDING CONTEXTUALIZED LARGE LANGUAGE MODEL RECOMMENDATIONS

BACKGROUND

Advancements in computing devices and networking technology have given rise to a variety of innovations in cloud-based digital content storage and access. For example, digital content systems can provide access to, and synchronize changes for, digital content items across devices. Existing systems can also provide a suite of computer applications to accomplish a variety of tasks in a workday, such as organizing a digital calendar, managing tasks, initiating and attending video calls, sending and receiving digital communications (e.g., text messages, emails, and instant messages), and editing documents in digital content management environments. Indeed, existing digital content systems can provide access to digital content for user accounts across diverse physical locations and over a variety of computing devices. In some cases, existing systems also provide access to large language models for analyzing or summarizing such digital content. Despite these capabilities, existing systems suffer from a variety of technical deficiencies, especially regarding operational flexibility and efficiency.

As just suggested, many existing systems are operationally inflexible. Indeed, existing systems generally adhere to the conventional context-free interaction paradigm for large language models of providing a generic repository of all available models and waiting for selection of a certain model in the repository to instantiate the model for a user account. Such a flat, unguided interaction structure relies on user input and understanding of available large language models and can lead to improper, uninformed, and inaccurate selection of large language models. Thus, conventional systems suffer from varying degrees of uncertainty and inaccuracy with regard to large language model selections.

Due at least in part to their inflexibility, existing systems are also inefficient. Specifically, the process of identifying and selecting a large language model in existing systems requires excessive numbers of client device interactions that could be reduced with a more efficient system. For example, accessing and interacting with a large language model using an existing system usually involves navigating through many layers of interfaces and/or scrolling through large lists of available models to access a desired large language model for instantiation. Moreover, in some existing systems, the interfaces for accessing content items are entirely separate (e.g., in separate interfaces and/or in separate applications altogether) from the interfaces for selecting and/or interacting with large language models to manipulate or analyze such content items. Not only is navigating between separate interfaces navigationally inefficient, but processing the excessive device interactions is also computationally inefficient, consuming computational resources such as processing power and memory that could be preserved with more efficient interfaces and/or a more efficient system. Indeed, caching data for the multiple interfaces and/or for the multiple separate applications for facilitating such navigation wastes computer memory that a more efficient system could preserve.

Thus, there are several disadvantages regarding existing digital content systems.

SUMMARY

This disclosure describes one or more embodiments of systems, methods, and non-transitory computer readable storage media that provide benefits and/or solve one or more of the foregoing and other problems in the art. For instance, the disclosed systems recommend large language models and/or virtual assistants to user accounts associated with content management systems. The disclosed systems make the large language model recommendations according to various factors, such as determining large language models and/or virtual assistants that have been granted access by user accounts to content items within a shared networking environment of a content management system. In some cases, the disclosed systems can determine relationships between user accounts, between content items accessed by a user account, and/or between user accounts and large language models and/or virtual assistants themselves as signals for recommending large language models. After determining the large language model and/or the virtual assistant, the disclosed systems can provide a notification indicating the large language model to a client device of the user account.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

Figure 1:
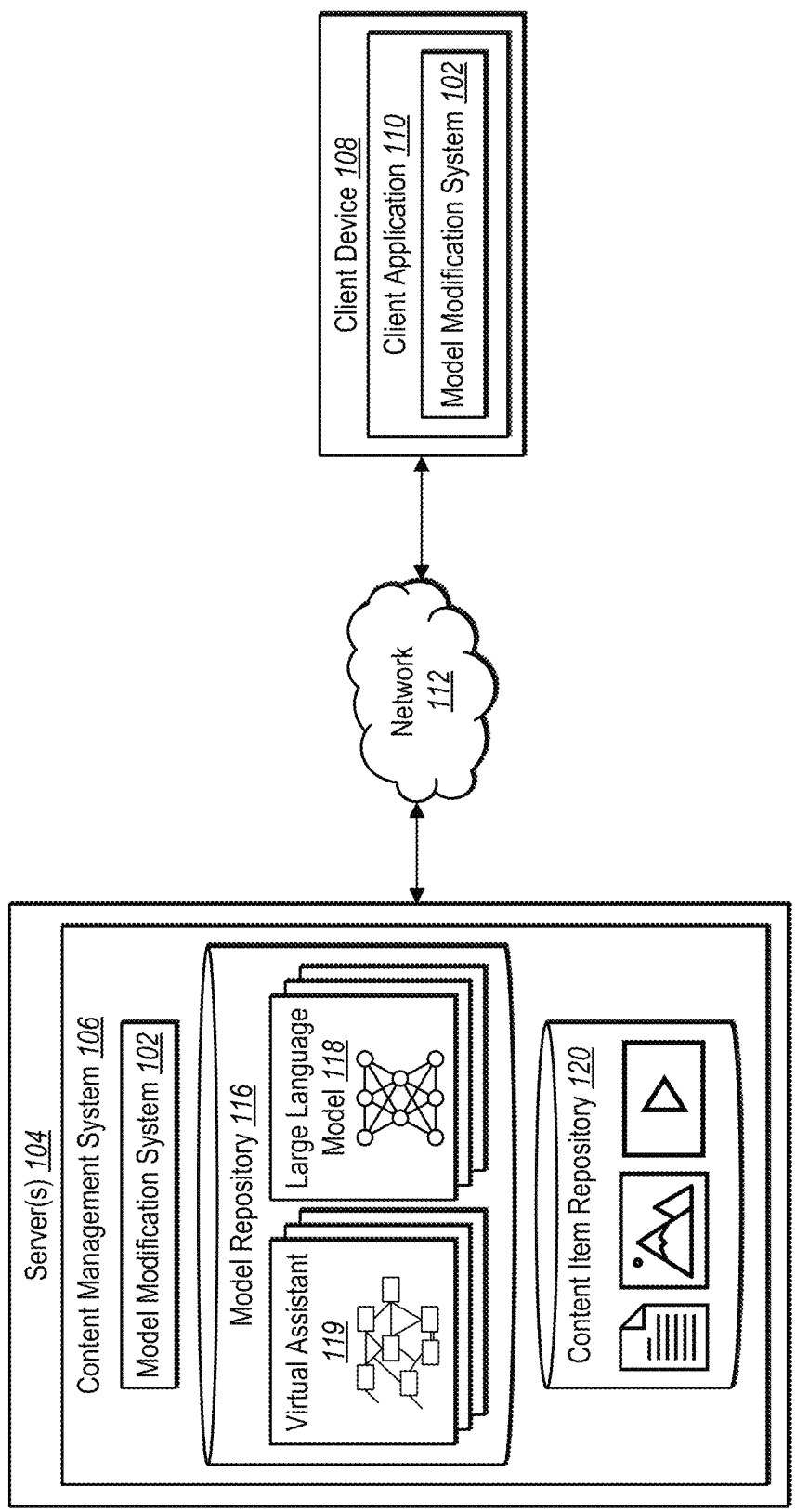
FIG. 1 illustrates a schematic diagram of an example environment of a model modification system in accordance with one or more embodiments.

This disclosure describes one or more embodiments of a model modification system that can generate a model recommendation for a user account based on contextual data within a content management system. User accounts within a cloud-based synchronization system, such as a content management system, often engage with and utilize large language models for a variety of tasks. To facilitate more efficient access to large language models (and to ultimately generate model outputs more efficiently), the model modification system can determine models to recommend to user accounts based on unique data available within a content management system. Indeed, the model modification system can identify one or more models used by user accounts (e.g., permitted to access content items stored for the user accounts) within a content management system. From among the models used by the user accounts, the model modification system can further identify and select a model to recommend to a target user account. The model modification system can further provide a notification corresponding to the recommended large language model for display on a client device.

Introduction to Large Language Model Recommendation

As just mentioned, the model modification system can identify a model to recommend to a user account within a content management system. To this end, the model modification system can identify one or more models permitted to access content items stored for user accounts within the content management system. For example, the model modification system can maintain a model database that includes a repository of models available to use for various functions or tasks, such as generating emails, summarizing documents, analyzing images to identify particular objects, or scanning spreadsheets and other documents to detect and/or correct particular phrases or data. In some cases, the model modification system can further determine which of the models are permitted or authorized to access content items (and can determine such authorization on a content-item-level basis and/or an account-level basis) stored in the content management system (or connected via one or more connectors). The model modification system can also maintain a knowledge graph of nodes and edges defining relationships among user accounts, content items, and LLMs. Based on data encoded in the knowledge graph, the model modification system can determine an LLM and/or a virtual assistant to recommend to a user account.

It should be noted that, as used herein, the term "model" can refer to a large language model or a virtual assistant. Indeed, the model modification can identify relationships between user accounts, content items, LLMs, and/or virtual assistants, and provide a recommendation to a user account for an LLM and/or a virtual assistant based on the relationships.

As part of determining a model to recommend, the model modification system can determine one or more LLMs (and/or virtual assistants) available to a user account within the content management system. Specifically, the model modification system can determine one or more LLMs (and/or virtual assistants within a model database that the user account is permitted or authorized to use or access. In some cases, as part of determining an LLM (and/or virtual assistant) to recommend, the model modification system can also compare the user account to other user accounts within the content management system. Specifically, the model modification system can utilize a knowledge graph to determine relationships between the user accounts within the content management system and the one or more LLMs (and/or virtual assistants) permitted to access content items within the content management system. The model modification system can thus inform the recommendation of an LLM (and/or virtual assistant) based on the relationships from the knowledge graph.

Based on identifying the model to recommend, the model modification system can provide a notification or a recommendation corresponding to the LLM (and/or virtual assistant) for display on a client device of the user account. For example, the model modification system can provide the notification to identify the LLM (and/or virtual assistant) for the user account. Additionally, or alternatively, the model modification system can provide the notification to invite the user account to join the LLM (and/or virtual assistant).

Introduction to Adapting Virtual Assistants

In one or more embodiments, the model modification system can generate and manage models, such as virtual assistants (e.g., agentic systems that include large language models or other architectures), for user accounts within a content management system. To this end, the model modification system can update and adapt parameters of virtual assistants over time as user accounts use the assistants to perform tasks and generate content items. In some cases, the model modification system can assign or determine traits for models specific to individual user accounts, depending on the usage of the models and their accuracy at performing various tasks or generating certain content items. As part of this process, the model modification system can determine one or more function tags of the models. The model modification system can utilize the one or more function tags to determine tasks or types of tasks that each model can perform with at least a threshold degree of accuracy. Accordingly, the model modification system can determine a task for a user account (e.g., by receiving a prompt from the user account or autonomously determining to perform the task).

Indeed, the model modification system can determine that a model is designated for tasks other than a requested task and can search a repository of available models (e.g., virtual assistants assigned to or associated with other user accounts in the content management system) to complete the task. The model modification system can cause the model to interface with and/or otherwise communicate with the additional model to enable the model to complete the task. For example, the model can autonomously generate a prompt instructing the additional model to generate data interpretable by the model to enable to complete the task. Alternatively, the model can autonomously generate a prompt instructing the additional model to complete the task.

Moreover, the model modification system can restrict access by models of content items within the content management system. For example, the model modification system can require a user account to grant a model permission to access content items associated with the user account. Indeed, when determining a model and/or an additional model to complete a task for a user account, the model modification system can determine one or more safeguarded content items (e.g., content items requiring authorization or permission to access) for completing the task. The model modification system can receive (e.g., via selection within an interface) permission from the user account for the model and/or additional model to access the safeguarded content items.

As suggested above, the model modification system can provide several improvements and/or advantages over existing digital content systems. For example, the model modification system can improve operational flexibility compared to existing systems. Indeed, as opposed to existing systems that adhere to the conventional interaction paradigm of providing a repository of available models and waiting for selection, the model modification system can intelligently determine and surface recommended LLMs (and/or virtual assistants). Specifically, the model modification system can utilize a knowledge graph to determine relationships among user accounts, content items, LLMs, and/or virtual assistants within a content management system and can provide a personalized LLM (and/or virtual assistant) recommendation to a user account according to the relationships. Indeed, the model modification system can aggregate and contextualize data from the content management system to provide personalized LLM (and/or virtual assistant) recommendations for a user account, thus flexibly adapting such recommendations on a per-account basis where recommended LLMs (and/or virtual assistants) are tailored specifically for a target user account (according to data encoded in the unique knowledge graph of the content management system).

In addition to improved operational flexibility, the Model modification system can also provide improved navigational efficiency. By providing personalized model recommendations to user accounts, the model modification system reduces the number of navigational interactions for accessing an LLM and/or virtual assistant. Indeed, as opposed to existing systems that require navigation across multiple interfaces and/or across multiple applications, the model modification system can provide a personalized model recommendation for the user account based on data specific to the user account (e.g., as encoded in a knowledge graph). Not only does the model modification system thereby reduce previously required navigational efforts, but the model modification system also preserves computational resources for processing navigational inputs as compared to prior systems. For instance, by condensing the model access into a shared interface with content item management and/or editing, the model modification system caches less interface data and/or application window data for accessing models compared to prior systems that split the functions of content item management and editing into separate interfaces (or applications) from model selection.

As illustrated by the foregoing discussion, the present disclosure utilizes a variety of terms to describe features and benefits of the model modification system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

In addition, the term "large language model" refers to a set of one or more machine learning models trained to perform computer tasks to generate or identify computing code and/or data in response to trigger events (e.g., user interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate or identify computing code and/or data based on various contextual data, including information from historical user account behavior.

Moreover, as used herein, the term "virtual assistant" refers to an artificial intelligence agent powered by a machine learning model to perform functions using data from stored content items. Indeed, a virtual assistant can be a machine learning model trained to operate autonomously (e.g., without user interaction prompting action or response generation). For example, a virtual assistant can operate without continuous intervention from a user account based on predefined traits ascribed or assigned to the virtual assistant (e.g., by performing trait-specific processes). Moreover, a virtual assistant can continually gather data from a content management system (according to permissions granted by the model modification system to the virtual agent, as will be discussed below with regards to FIG. 8). A virtual assistant can utilize algorithms, rules, heuristics, or machine learning models to make autonomous decisions based on data gathered from the content management system. Moreover, a virtual assistant can implement reinforcement learning techniques to improve its performance. Additionally, a virtual assistant can interact with large language models, other virtual assistants, user accounts, digital content items, etc.

Relatedly, as used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks. In some embodiments, the model modification system utilizes a large language machine learning model in the form of a neural network.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., content item summaries or other generated content items) based on a plurality of inputs provided to the neural network. In some cases, a neural network refers to an algorithm (or a set of algorithms) that implements deep learning techniques to model high-level abstractions in data. A neural network can include various layers such as an input layer, one or more hidden layers, and an output layer that each perform tasks for processing data. For example, a neural network can include a deep neural network a convolutional neural network, a recurrent neural network (e.g., an LSTM), a graph neural network, or a large language model.

Additionally, as used herein, the term "access pattern" refers to a data pattern or correlation for how a content item is accessed by one or more user accounts. For example, an access pattern can define the timing, recency, and/or frequency with which a content item is accessed, modified, or otherwise interacted with (including data indicating which user account(s) perform the interactions), as well as details about each interaction, such as time of day, date, duration, and actions performed by the user account relating to the content item for each instance of interaction. Moreover, an access pattern can determine a correlation between the content item and a large language model, or a type of large language model, that receives the content item, or a part of the content item, as an input.

Along these lines, as used herein, the term "usage pattern" refers to a data pattern or correlation for how a large language model is used by one or more user accounts. For example, a usage pattern can define usage data for a large language model, including and a task or type of task performed by the large language model, when the task is performed, which user account(s) requested the task, and/or what the input and output data were for the task. A usage pattern can define a timing, recency, and/or frequency of use of a large language model—the timing, recency, and/or frequency can be task-specific and/or across multiple tasks. In addition, a usage pattern can define a correlation between a large language model and an input or a type of input received by the large language model. Moreover, a usage pattern can define a correlation between a large language model and data relating to a user account, such as a job type of the user account.

Additional detail regarding the model modification system will now be provided with reference to the figures. For example, FIG. 1 illustrates a schematic diagram of an example system environment for implementing a model modification system 102 in accordance with one or more implementations. An overview of the model modification system 102 is described in relation to FIG. 1. Thereafter, a more detailed description of the components and processes of the model modification system 102 is provided in relation to the subsequent figures.

As shown, the environment includes server(s) 104, a client device 108, and a network 112. Each of the components of the environment can communicate via the network 112, and the network 112 may be any suitable network over which computing devices can communicate. Example networks are discussed in more detail below in relation to FIGS. 11-12.

As mentioned above the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 11-12. The client device 108 can communicate with the server(s) 104 via the network 112. For example, the client device 108 can receive user input from a user interacting with the client device 108 (e.g., via a client application 110) to, for instance, access, generate, modify, or share a content item, to collaborate with a co-user of a different client device, or to select a user interface element. In addition, the model modification system 102 on the server(s) 104 can receive information relating to various interactions with content items and/or user interface elements based on the input received by the client device 108 (e.g., to generate a model recommendation and/or add a user account to a set of permitted accounts accessing a model).

As shown, the client device can include a client application 110. In particular, the client application 110 may be a web application, a native application installed on the client device 108 (e.g., a mobile application, a desktop application, etc.), or a cloud-based application where all or part of the functionality performed by the server(s) 104. Based on instructions from the client application 110, the client device 108 can present or display information, including a model modification interface for surfacing model recommendations and receiving input to join models, and/or a content selection interface for selecting content items accessible by the model (e.g., the LLM and/or the virtual assistant).

As illustrated in FIG. 1, the example environment also includes the server(s) 104. The server(s) 104 may generate, track, store, process, receive, and transmit electronic data, such as digital content (e.g., content items), LLMs, LLM recommendations, virtual assistants, virtual assistant recommendations, prompts, interface elements, interactions with digital content items, interactions with interface elements, and/or interactions between user accounts or client devices. In addition, the server(s) 104 can transmit data to the client device 108 in the form of content items or notifications corresponding to large language models. Indeed, the server(s) 104 can communicate with the client device 108 to send and/or receive data via the network 112. In some implementations, the server(s) 104 include(s) a number of server devices distributed across the network 112 and located in different physical locations. The server(s) 104 can comprise one or more content servers, application servers, communication servers, web-hosting servers, machine learnings servers, and other types of servers.

As shown, the server(s) can also include a model repository 116. The model repository 116 can be a database used to store LLMs, such as an LLM 118, as well as virtual assistants, such as a virtual assistant 119. For example, the content management system 106 can store LLMs (and/or virtual assistants) used by user accounts within the content management system 106. For example, the LLM 118 (and/or the virtual assistant 119) can be native to, housed or hosted on, and/or maintained by the content management system 106. Additionally or alternatively, the LLM 118 (and/or the virtual assistant 119) can be third party large language model that is hosted on third party servers—where the model repository 116 is located on third-party servers in the network environment in communication with the server(s) 104 via the network 112.

As shown in FIG. 1, the server(s) 104 can also include the model modification system 102 as part of the content management system 106. The content management system 106 can communicate with the client device 108 to perform various functions associated with the client application 110 such as managing user accounts, managing content collections, managing models (e.g., LLMs and/or virtual assistants), managing model recommendations, managing content items, and facilitating user interaction with the modifications, the model recommendations, the content collections, and/or content items. Indeed, the content management system 106 can include a network-based smart cloud storage system to manage, store, and maintain content items, models (e.g., LLMs and/or virtual assistants), and related data across numerous user accounts, including user accounts in collaboration with one another.

FIG. 1 further illustrates a content item repository 120. The content item repository can be a database used to store content items that are utilized by user accounts within the content management system 106. The content item repository 120 can be native to the content management system 106 or accessed remotely by the content management system 106 via the network 112.

Although FIG. 1 depicts the model modification system 102 located on the server(s) 104, in some implementations, the model modification system 102 may be implemented by (e.g., located entirely on or in part on) one or more other components of the environment. For example, the Model modification system 102 may be implemented by the client device 108 and/or a third-party device. For example, the client device 108 can download all or part of the model modification system 102 for implementation independent of, or together with, the server(s) 104. Moreover, in some implementations, the model modification system 102 may solely identify and/or recommend LLMs. Additionally, in some implementations, the model modification system 102, the model modification system 102 may solely identify and/or recommend virtual assistants. Indeed, in some implementations, the model modification system 102 may identify and/or recommend LLMs and virtual assistants.

In some implementations, though not illustrated in FIG. 1, the environment may have a different arrangement of components and/or may have a different number or set of components altogether. For example, the client device 108 may communicate directly with the model modification system 102, bypassing the network 112. As another example, the environment can include a database located external to the server(s) 104 (e.g., in communication via the network 112) or located on the server(s), on a third-party system, and/or on the client device 108.

Figure 2:
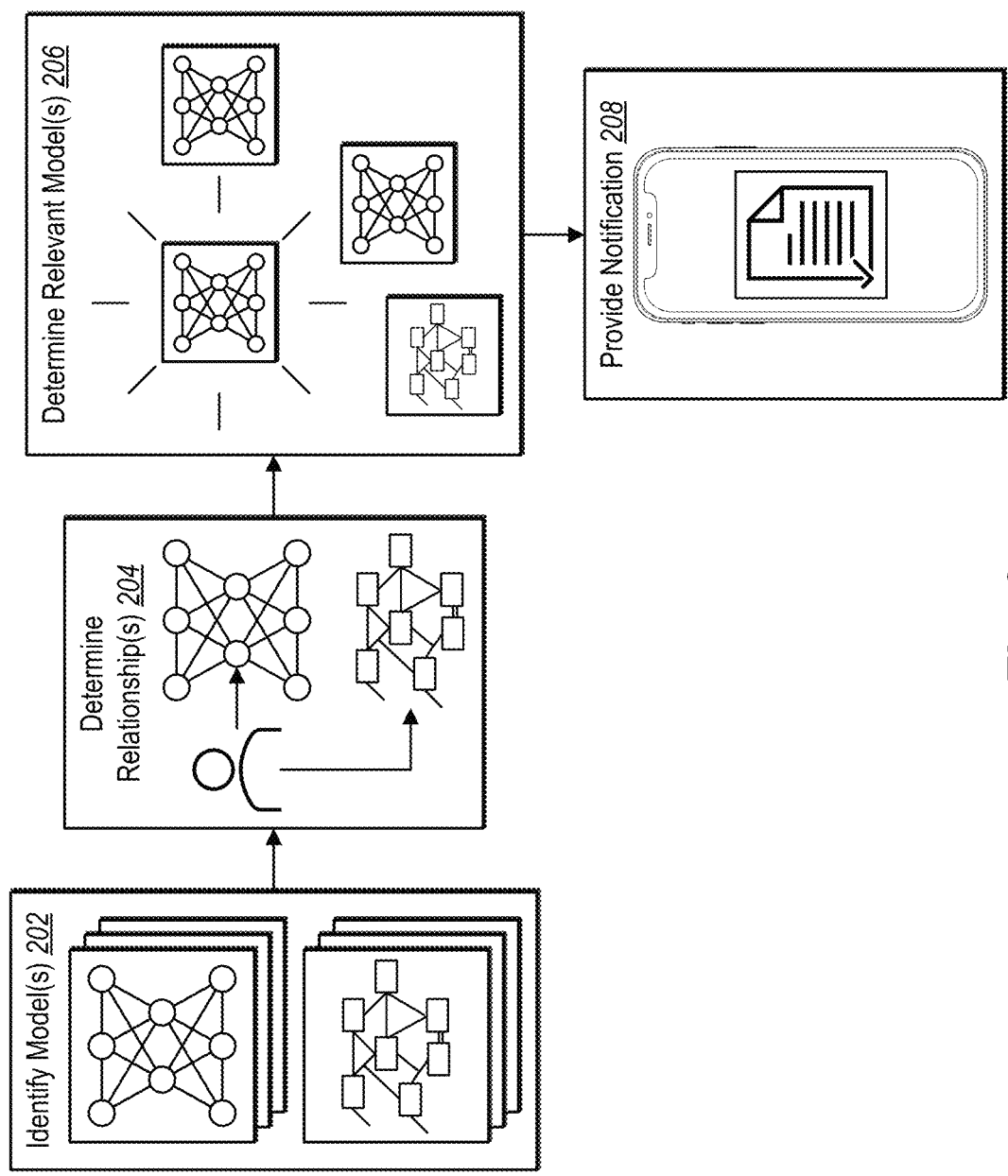
FIG. 2 illustrates an example overview of the model modification system identifying one or more models and determining a model from among the one or more models in accordance with one or more embodiments.

As mentioned above, the model modification system 102 can identify one or more large language models with access to digital content items on a content management system. Additionally, the model modification system 102 can determine relationships between user accounts associated with the content management system and the one or more large language models permitted access to the content items. Indeed, based on these relationships the model modification system 102 can determine relevant model(s) (e.g., LLMs and/or virtual assistants) and provide a notification corresponding to the relevant large language models to a client device of a user account. FIG. 2 illustrates an overview of identifying models (e.g., LLMs and/or virtual assistants), determining relationships between user accounts and models, determining relevant models according to the relationships, and providing a notification corresponding to the relevant models in accordance with one or more embodiments. Additional detail regarding the acts and processes introduced in relation to FIG. 2 is provided thereafter with reference to subsequent figures.

Large Language Model Recommendation

As illustrated in FIG. 2, in some embodiments, the model modification system 102 performs an act 202 to identify model(s) (e.g., LLMs and/or virtual assistants) permitted to access content items stored for user accounts within a content management system. For example, the model modification system 102 can identify model(s) generated or spun up within a repository housed within, or otherwise available to, the content management system, and which access content items (e.g., as retrieval-augmented generators) of user accounts within the content management system. In addition, the model modification system 102 track interactions between user accounts associated with the content management system and models utilized by the user accounts. In some embodiments, the model modification system 102 can use metadata of content items to track access to the content items by models. The Model modification system 102 can monitor file access logs of content items within the content management system to determine patterns or access times that might indicate automated access by a model.

Moreover, in some embodiments, the model modification system 102 can examine the content of content item requests to determine linguistic patterns or structures typical of model-generated text. For example, these linguistic patterns or structures typical of model-generated text can include consistent use of formal language, repetitive phrasing, high lexical richness, lack of personal anecdotes, over-explanation of simple concepts, neutral tone, or frequent use of transition phrases to determine model-generated content item requests. Indeed, in some embodiments, the model modification system 102 can train a machine learning model to detect linguistic patterns or structures typical of model generated text and utilize the machine learning model to identify model-generated requests for content items.

Indeed, as illustrated, the model modification system 102 can perform an act 204 to determine relationship(s) between the user accounts associated with the content management system, large language models permitted to access content items within the content management system, and/or virtual assistants permitted to access content items within the content management system. For example, the model modification system 102 can determine a correlation between a large language model (and/or a virtual assistant) and a type of prompt input to the large language model by a user account. Indeed, in some embodiments, the model modification system 102 can determine a correlation between a user account and a specific timeframe of activity utilizing an LLM (and/or a virtual assistant). In certain cases, the model modification system 102 determines relationships based on data encoded within a knowledge graph of the content management system. More information regarding the model modification system 102 determining relationships between user accounts within a content management system and large language models can be found below with regard to FIGS. 3-5.

As illustrated in FIG. 2., the model modification system 102 can perform an act 206 to determine relevant model(s) (e.g., large language models and/or virtual assistants). Specifically, the model modification system 102 can use the relationships identified in the act 204 to determine one or more relevant models for a user account within the content management system. For example, the model modification system 102 can determine a plurality of similarities between a target user account and other user accounts within the content management system. Such similarities can include similarities in content items accessed by the user account and the user accounts. In some embodiments, the similarities can include similarities in types of tasks (e.g., modifications, edits, shares, accesses, and/or comments) performed by the user account and the user accounts (e.g., to similar types of content items). More information regarding determining relevant LLMs (and/or virtual assistants) can be found below with regard to FIGS. 3-5.

As illustrated, the model modification system 102 can perform an act 208 to provide a notification corresponding to the LLM (and/or virtual assistant). Indeed, the model modification system 102 can provide the notification in a user interface of a client device associated with the user account. Specifically, the model modification system 102 can include an invitation to join the LLM(s) (and/or virtual assistant(s)) that the model modification system 102 determines to be relevant in the act 208. The model modification system 102 can include a variety of information in the notification. For example, the model modification system 102 can include an explanation for why the model modification system 102 determined the LLM (and/or virtual assistant) was relevant for the user account. In some embodiments, the model modification system 102 can include an explanation of one or more functionalities of the LLM (and/or virtual assistant) in the notification. In some embodiments, the model modification system 102 can provide an explanation of the one or more functionalities of the LLM in a second notification.

Figure 3:
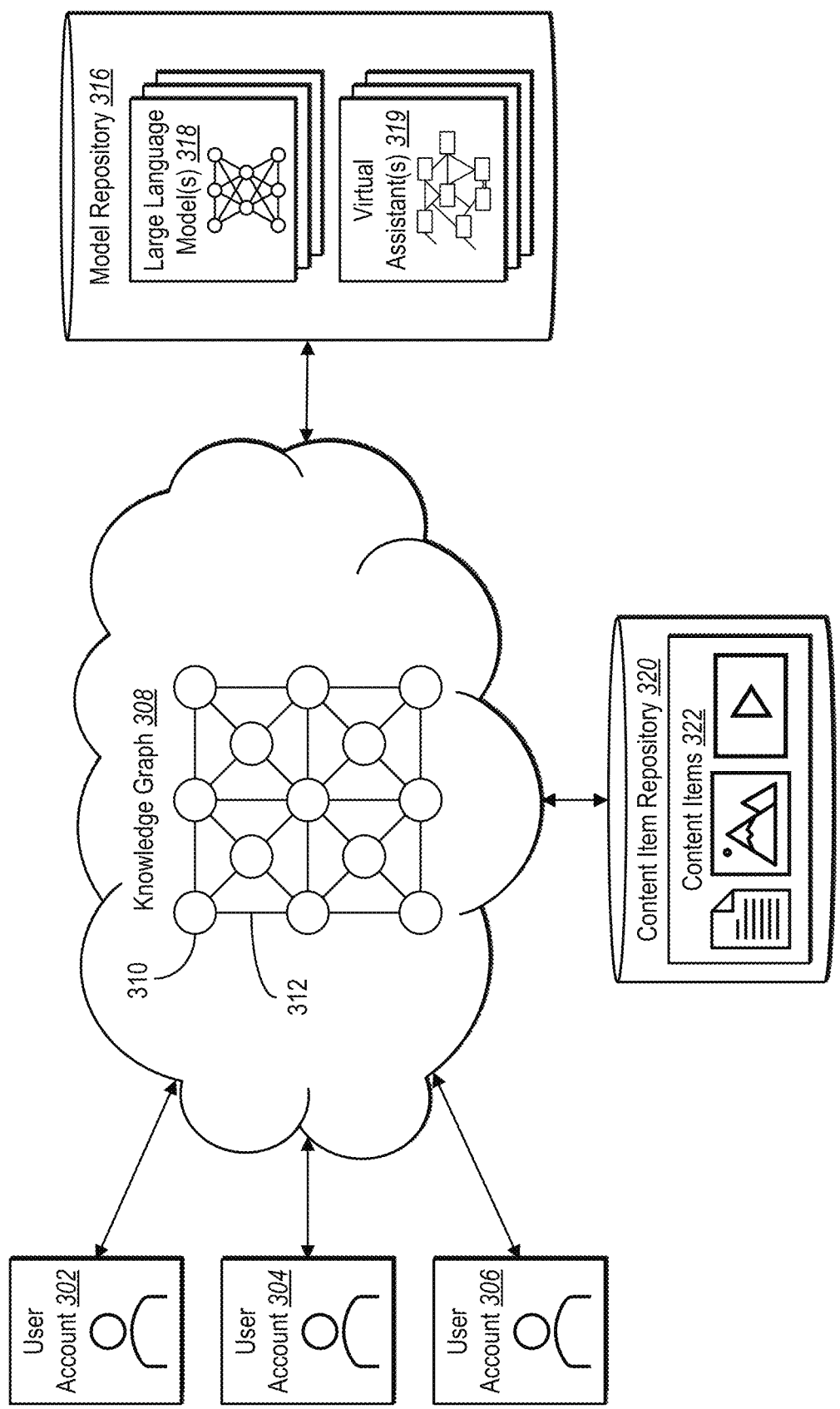
FIG. 3 illustrates the model modification system utilizing a knowledge graph to determine relationships between user accounts, content items, and models in accordance with one or more embodiments.

As previously mentioned, the model modification system 102 can utilize a knowledge graph to determine relationships between user accounts, content items accessed by the user accounts, LLMs, and/or virtual assistants utilized by the user accounts. FIG. 3 illustrates generating and utilizing a knowledge graph aggregating data from user accounts, a content item repository, and a model repository within a content management system in accordance with one or more embodiments.

As illustrated in FIG. 3, the model modification system 102 can include and update a knowledge graph 308. Indeed, the model modification system 102 can determine which data sources to include in the knowledge graph 308. For example, the model modification system 102 can determine to include data from user accounts (e.g., a user account 302, a user account 304, and/or a user account 306), content items 322 of a content item repository 320 (e.g., the content item repository 120 of the content management system 106 of FIG. 1), LLM(s) 318, and/or virtual assistant(s) 319 of an model repository 316 (e.g., the LLM(s) 118 and/or the virtual assistants of the model repository 116 of the content management system 106 of FIG. 1). More specifically, the model modification system 102 can determine data sources that inform and/or define nodes 310 and edges 312 of the knowledge graph 308.

Indeed, the model modification system 102 can represent a variety of data sources as nodes 310 of the knowledge graph 308. For example, the model modification system 102 can generate the knowledge graph 308 such that a first plurality of nodes are representative of user accounts (e.g., the user account 302, the user account 304, and/or the user account 306), a second plurality of nodes are representative of content items 322, and/or a third plurality nodes are representative of LLM(s) 318 and/or virtual assistant(s) 319). Accordingly, the model modification system 102 can utilize the edges 312 of the knowledge graph to represent relationships between various nodes 310, such relationships between user accounts, between content items 322, between LLM(s) 318, between user accounts and content items 322, between user accounts and LLM(s) 318, between content items 322 and LLM(s) 318, between virtual assistant(s) 319, between virtual assistant(s) 319 and LLM(s) 318, between virtual assistant(s) 319 and user accounts, and/or between virtual assistant(s) 319 and content items 322).

Moreover, by identifying data sources that define and/or inform nodes 310 and edges 312 of the knowledge graph, the model modification system 102 identifies and updates which nodes 310 are connected to each other, the distance between nodes 310, the lengths of edges 312, and/or the degrees of removal between nodes. For example, the model modification system 102 can utilize a length of an edge 312 to represent a similarity (e.g., closeness) of nodes connected by the edge 312 (e.g., where a short edge indicates a high similarity or closeness of nodes). Additionally or alternatively, the model modification system 102 can represent the similarity of nodes by degrees of separation of the nodes. For example, nodes that are connected by one edge can have a higher similarity than nodes that are connected by two edges, with a node separating them.

Indeed, in some embodiments, the user accounts, content items 322, LLM(s) 318, and virtual assistant(s) 319 can be part of an observation layer. To elaborate, the model modification system 102 can utilize an observation layer program that includes computer script which runs to monitor digital content displayed on a client device. Indeed, the observation layer can track displayed content items 322 (e.g., content items 322 that are displayed on a client device associated with a user account, such as the user accounts 302-306). Specifically, model modification system 102 can utilize the observation layer track displayed content items, including item identifiers for the displayed content items 322, network locations where the content items 322 are stored, and computer applications presenting various content items 322. In some cases, the model modification system 102 can utilize the observation layer to track and determine pixel values at various pixel coordinate locations of a display screen for a client device, including metadata indicating content item identifiers, computer applications, and network locations associated with the various pixels and their values. Additionally, the model modification system 102 can utilize the observation layer to track changes in the displayed content (e.g., in pixel values) over time, determining timestamps associated with displayed content items 322 (and/or pixel values). Moreover, the model modification system 102 can utilize the observation layer to track and/or otherwise determine which user account is viewing, displaying, editing, and/or otherwise interacting with the content items 322.

Additionally, the model modification system 102 can utilize the observation layer to track LLM(s) 318 and/or virtual assistant(s) 319 that are utilized by the user accounts. Indeed, the model modification system 102 can utilize the observation layer to track metadata associated with the applications, network locations, and/or web browsers associated with the LLM(s) 318 (and/or the virtual assistant(s) 319). Moreover, in addition to tracking associations between user accounts and LLM(s) 318 (and/or virtual assistant(s) 319), the model modification system 102 can utilize the observation layer to track content items 322 that are input and/or otherwise utilized in the LLM(s) 318 (and/or the virtual assistant(s) 319). In addition, the model modification system 102 can utilize the observation layer to track queries made by the LLM(s) 318 (and/or the virtual assistant(s) 319) to the content item repository 320.

The model modification system 102 can compare data from the knowledge graph gathered by the observation layer. For example, the model modification system 102 can compare tasks performed in association with the content item 418 by the user account 402 and the additional user account (e.g., the user account 404), such as edits, reviews, or accesses by the user account 402 and the additional user account. Additionally, the model modification system 102 can determine a file type of the content item (such as a document, a spreadsheet, a presentation, etc.). The model modification system 102 can utilize the file type of the content item 418 and the comparison of the tasks performed in association with the content item 418 to determine the model 410.

In addition, the model modification system 102 can determine user account interaction data sources for the knowledge graph 308. For example, the model modification system 102 monitors or detects user account behavior within the content management system over time. The model modification system 102 can monitor accesses, shares, comments, edits, receipts, moves, deletes, new content creations, clips (e.g., generating content items from other content items), and/or other user interactions over time to determine frequencies, recencies, and/or overall numbers of user interactions (of the user account, of collaborating user accounts with the user account, and/or of user accounts within a threshold degree of separation from the user account within the knowledge graph 308) with content items and/or with other user accounts. In some embodiments, the model modification system 102 generates, modifies, and maintains the knowledge graph 308 using one or more machine learning models (e.g., neural networks) to predict relationships among user accounts, content items 322, LLM(s) 318, and/or virtual assistant(s) 319.

Moreover, in some embodiments, the model modification system 102 can utilize a connector data source to inform lengths and connections of nodes 310 and edges 312 in the knowledge graph 308. More particularly, the model modification system 102 utilizes computer code of a software connector to ingest data from external, third-party computer applications. For example, the model modification system 102 utilizes the connector to connect to a third-party application (e.g., an application hosted and executed outside of the content management system 106 and/or apart from the server(s) 104) to ingest data from the third-party application. In some cases, the model modification system 102 utilizes the connector to ingest data as a data stream or in a push-pull fashion based on API requests with the third-party application. For instance, the model modification system 102 can utilize the connector to extract or ingest data indicating interactions or activity with content items 322, LLM(s) 318, and/or virtual assistant(s) 319 using a third-party application, such as an email application, a messaging application, a calendar application, a digital image editing application, or a web browser application. Ingested or extracted data can include identifiers for content items 322 LLM(s) 318 and/or virtual assistant(s) 319 that are selected, modified, deleted, moved, accessed, or otherwise interacted with, along with timestamps of the corresponding actions.

In some cases, the model modification system 102 generates larger nodes 310 for higher frequencies of interaction with respective user accounts, content items 322, LLM(s) 318, and/or virtual assistant(s) 319. In these or other cases, the model modification system 102 generates edges 312 to have lengths or distances that indicate closeness of relationships between nodes 310. For example, the model modification system 102 generates edges 312 between nodes 310 to reflect frequencies and/or recencies of interaction with respective user accounts, content items 322, LLM(s) 318, and/or virtual assistant(s) 319. In some embodiments, the model modification system 102 generates edges 312 to reflect the types of user account interactions with the content items 322 (e.g., where edits indicate closer relationships than shares, which in turn indicate closer relationships than accesses) the LLM(s) 318, and/or the virtual assistant(s) 319 (e.g., where higher levels of interaction indicate closer relationships than lower levels of interaction, which in turn indicate closer relationships than a user account having access to an LLM and/or virtual assistant). Moreover, the model modification system 102 generates edges to reflect the types of interactions between the LLM(s) 318 (and/or the virtual assistant(s) 319) and the content items 322 (e.g., where a higher frequency of input of a content item into a large language model indicates a closer relationship than a lower frequency, which in turn indicates a closer relationship than an LLM and/or virtual assistant requesting information about a content item from the content item repository 320).

Additionally, the model modification system 102 can determine and utilize a world state data source to generate and/or update the knowledge graph 308. In particular, the model modification system 102 can determine a world state of a client device, where the world state can include or indicate client device metrics and environmental metrics. The model modification system 102 can further define nodes and edges of user accounts 302-306, content items 322, LLM(s) 318, and/or virtual assistant(s) 319 based on world state data indicating client device metrics and/or environmental metrics associated with access or use of the content items 322 and/or of the LLM(s) 318 (and/or the virtual assistant(s) 319) by a target user account and/or similar user accounts. The model modification system 102 can determine client device metrics that indicate operation systems settings, such as brightness settings, language settings, fan speed settings, contrast settings, and dark mode settings. The model modification system 102 can utilize operation system function to monitor or detect processor performance and/or memory performance of the client device. In addition, the model modification system 102 can determine client device metrics indicating physical measurements from sensors of the client device. Specifically, the model modification system 102 utilizes an internal temperature sensor to determine an internal temperature of the client device (e.g., of a processor within the client device).

In addition, the model modification system 102 can determine environmental metrics of a client device. Indeed, the model modification system 102 can determine a world state of the client device based on physical measurements or readings from the client device and/or from nearby client devices (e.g., devices within a threshold distance of the client device). For example, the model modification system 102 can utilize a camera to determine a brightness of the environment or the physical surroundings of the client device. Additionally, the model modification system 102 can utilize the camera to determine a proximity of a user to the client device and/or an engagement with the client device (e.g., eye movement and focus). Further, the model modification system 102 can utilize an external temperature sensor of the client device to determine an external temperature of the environment of the client device. Further still, the model modification system 102 can utilize a microphone to detect ambient noise in the environment of the client device. In some embodiments, the model modification system 102 can utilize a GPS sensor to determine a coordinate location (e.g., latitude, longitude, and/or elevation) of the client device. In some cases, the model modification system 102 can utilize the aforementioned sensors of the client device and of the client devices within a threshold distance of the client device to build a world state based on average sensor reading values.

Indeed, the model modification system 102 can generate a recommendation for a large language model for the user account 302. Specifically, the model modification system 102 can utilize the knowledge graph 308 to determine relationships between the user account 302 and the one or more LLM(s) 318 (and/or the one or more virtual assistant(s) 319) utilized by the user accounts 304-306. The model modification system 102 can generate the recommendation to provide to the user account 302 based on the relationships between the user account 302 and the one or more LLM(s) 318 (and/or the one or more virtual assistant(s) 319). For example, the model modification system 102 can determine, based on the nodes 310 and edges 312 of the knowledge graph 308, a proximity between the user account 302 and the one or more LLM(s) 318 (and/or the one or more virtual assistant(s) 319). Moreover, the model modification system 102 can utilize the nodes 310 and edges of the 312 of the knowledge graph 308 to determine relationships between the user account 302 and the user accounts 304-306 (e.g., other user accounts within the content management system). The model modification system 102 can determine a large language model from among the LLM(s) 318 (and/or virtual assistant(s) 319) according to the relationships between the user account 302 and the user accounts 304-306.

Moreover, the model modification system 102 can utilize the various data sources to generate three different types of nodes in the node graph: nodes of a first type that represent user accounts, nodes of a second type that represent content items, nodes of a third type that represent LLMs, and nodes of a fourth type that represent virtual assistant(s). Accordingly, the model modification system 102 can generate ten different types of edges: edges of a first type that connect nodes of the first type to nodes of the second type (e.g., edges that represent relationships between user accounts and content items), edges of a second type that connect nodes of the first type to nodes of the third type (e.g., edges that represent relationships between user accounts and LLMs) edges of a third type that connect nodes of the second type to nodes of the third type (e.g., edges that represent relationships between content items and LLM(s), edges of a fourth type that connect nodes of the first type (e.g., edges that represent relationships between user accounts), edges of a fifth type that connect nodes of the second type (e.g., edges that represent relationships between user accounts), and edges of a sixth type that connect nodes of the third type (e.g., edges that represent relationships between LLMs), edges of a seventh type that connect nodes of the fourth type (e.g., edges that represent relationships between virtual assistants), edges of an eighth type that connect nodes of the first type to nodes of the fourth type (e.g., edges that represent relationships between user accounts and virtual assistants), edges of a ninth type that connect nodes of the second type to nodes of the fourth type (e.g., edges that represent relationships between content items and virtual assistants), edges of a tenth type that connect nodes of the third type to nodes of the fourth type (e.g., edges that represent relationships between LLMs and virtual assistants). More information regarding the various types of edges will be provided below with regard to FIGS. 4-5.

Figure 4:
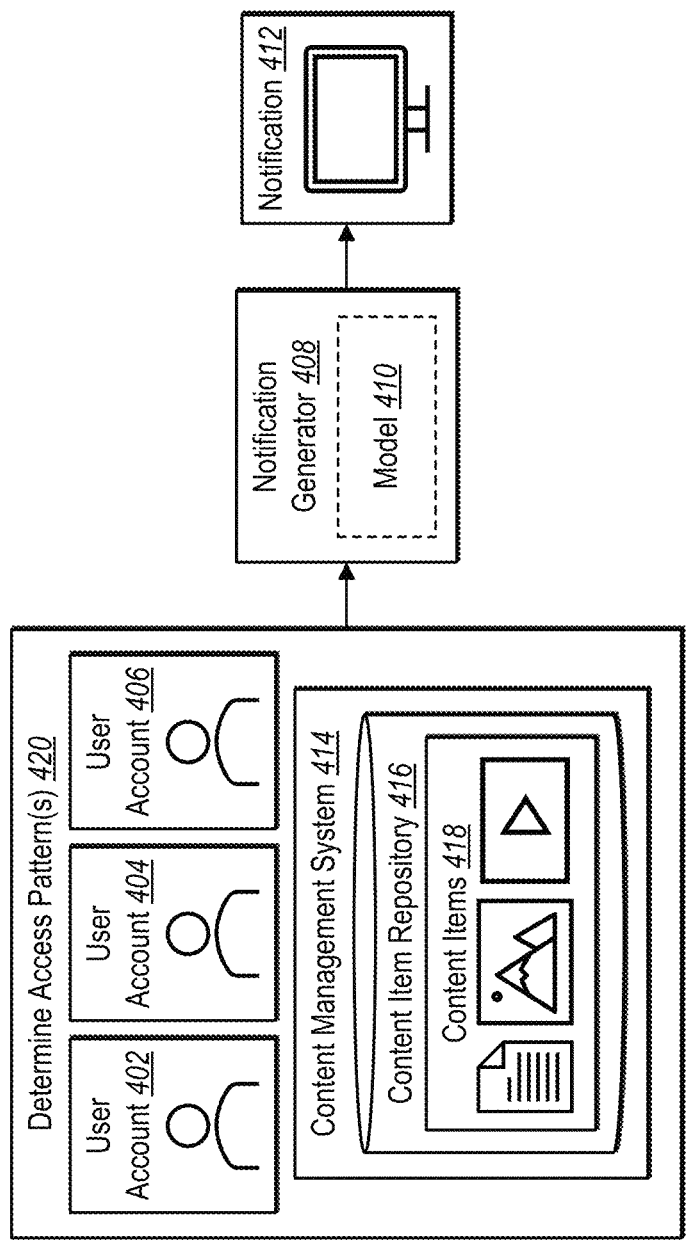
FIG. 4 illustrates the model modification system determining access patterns for content items provided to one or more models and providing a corresponding notification in accordance with one or more embodiments.

As previously mentioned, the model modification system 102 can determine access patterns of one or more content items by one or more user accounts (e.g., to inform LLM recommendations). FIG. 4 illustrates the model modification system 102 determining access patterns for content items by user accounts and generating a notification corresponding to a model recommendation (e.g., an LLM recommendation and/or a virtual assistant recommendation) in accordance with one or more embodiments.

As illustrated in FIG. 4, the model modification system 102 can perform act 420 to determine access pattern(s) of one or more content items 418 by the user accounts (e.g., a user account 402, a user account 404, and/or a user account 406, among others). To determine the access pattern(s), the model modification system 102 can access the content items 418 from a content item repository 416 (e.g., the content item repository 120 of FIG. 1) of a content management system 414 (e.g., the content management system 106 of FIG. 1).

In some embodiments, as part of the act 420, the model modification system 102 can utilize a knowledge graph (e.g., the knowledge graph 308 of FIG. 3) to determine the access patterns. For example, the model modification system 102 can determine a first access pattern for a content item 418 accessed by the user account 402. Additionally, the model modification system 102 can determine a second access pattern for the content item accessed by an additional user account (e.g., the user account 404). For example, the model modification system 102 can utilize metadata indicating timestamps of interactions between the user account 402 and a content item to determine the first access pattern. Additionally, the model modification system 102 can utilize recency and/or frequency metrics (e.g., data from an observation layer) of the additional user account (e.g., the user account 404) to determine the second access pattern.

In one or more embodiments, the model modification system 102 can determine a model 410 (e.g., an LLM and/or a virtual assistant) according to a comparison of the first access pattern and the second access pattern. Specifically, the model modification system 102 can compare accesses or other interactions with a content item performed by a first user account (e.g., the user account 402) against interactions with the same content item performed by a second user account (e.g., the user account 404). Additionally or alternatively, the model modification system 102 can compare a first access pattern for a first content item with a second access pattern for a second content item (e.g., a content item within a threshold similarity of the first content item, as indicated by the knowledge graph).

In some embodiments, the model modification system 102 determines, according to the comparison of the first access pattern and the second access pattern, that the user account 402 and the additional user account both edit the content item 418. The model modification system 102 further determines, from the first and/or second access pattern, that the model 410 has previously processed the content item 418 (or a content item within a threshold similarity, as indicated by the knowledge graph) and/or that the model 410 is specifically designed for a content type of the content item 418. Accordingly, the model modification system 102 can determine (e.g., recommend) the model 410 to the user account 402.

In some cases, the model modification system 102 can determine one or more functionalities of one or more models (e.g., LLMs and/or virtual assistants) permitted to access content items 418 stored for user accounts (e.g., the user account 402, the user account 404, and/or the user account 406). The model modification system 102 can determine the model 410 (e.g., an LLM and/or a virtual assistant) from among the one or more models by comparing the one or more functionalities of the one or more models with the first access pattern or the second access pattern. Phrased differently, the model modification system 102 can determine which of the functionalities of the one or more models (e.g., LLMs and/or virtual assistants) align with the first access pattern for the content item and/or the second access pattern for the content item.

As illustrated, the model modification system 102 can utilize a notification generator 408 to generate a notification 412 corresponding to the model 410 (e.g., the LLM and/or virtual assistant determined according to the comparison of the first access pattern and the second access pattern). Indeed, the model modification system 102 can provide the notification 412 via a client device associated with the user account 402. The model modification system 102 can include a rationale or an explanation for how/why the model modification system 102 determined to recommend the model 410 to the user account 402 (e.g., including a relationship to the user account 402, the content items 418, and/or one or more access patterns). Moreover, the model modification system 102 can include an explanation of one or more functionalities of the model 410 in the notification 412. In some embodiments, the model modification system 102 can provide a second notification corresponding to one or more functionalities of the Model modification system 102 responsive to an indication of an interaction from the user account 402 with the notification 412.

In some embodiments, the model modification system 102 can use access patterns for content items 418 to define edges of a knowledge graph. Specifically, the model modification system 102 can generate specialized access pattern edges and/or can modify existing edges of the knowledge graph to connect the nodes of the first type (e.g., user accounts) to the nodes of the second type (e.g., the content items 418). The model modification system 102 can also modify edges connecting LLM nodes based on the access patterns and/or the relationship of LLM functions to the access patterns. Thus, the model modification system 102 can determine the model 410 (e.g., an LLM and/or a virtual assistant) from among the one or more models (e.g., LLMs and/or virtual assistants) according to the edges.

In some cases, the model modification system 102 determines user-account-specific access patterns that indicate which content items user accounts access (or otherwise interact with). For instance, the model modification system 102 determines that the user account 404 accesses a particular set of content items in a particular order, including timestamps and/or frequency indications of the accesses. The model modification system 102 further determines, as part of the access pattern, that the user account 404 accesses the model 410 within the sequence of content item accesses (or other interactions). The model modification system 102 can thus determine that, based on an access pattern of the user account 402 being within a threshold similarity of the access pattern of the user account 404, that the user account 402 is likely to access the model 410. The model modification system 102 can thus generate the notification 412 for recommending the model 410 (e.g., the LLM and/or the virtual assistant) to the user account 402.

Figure 5:
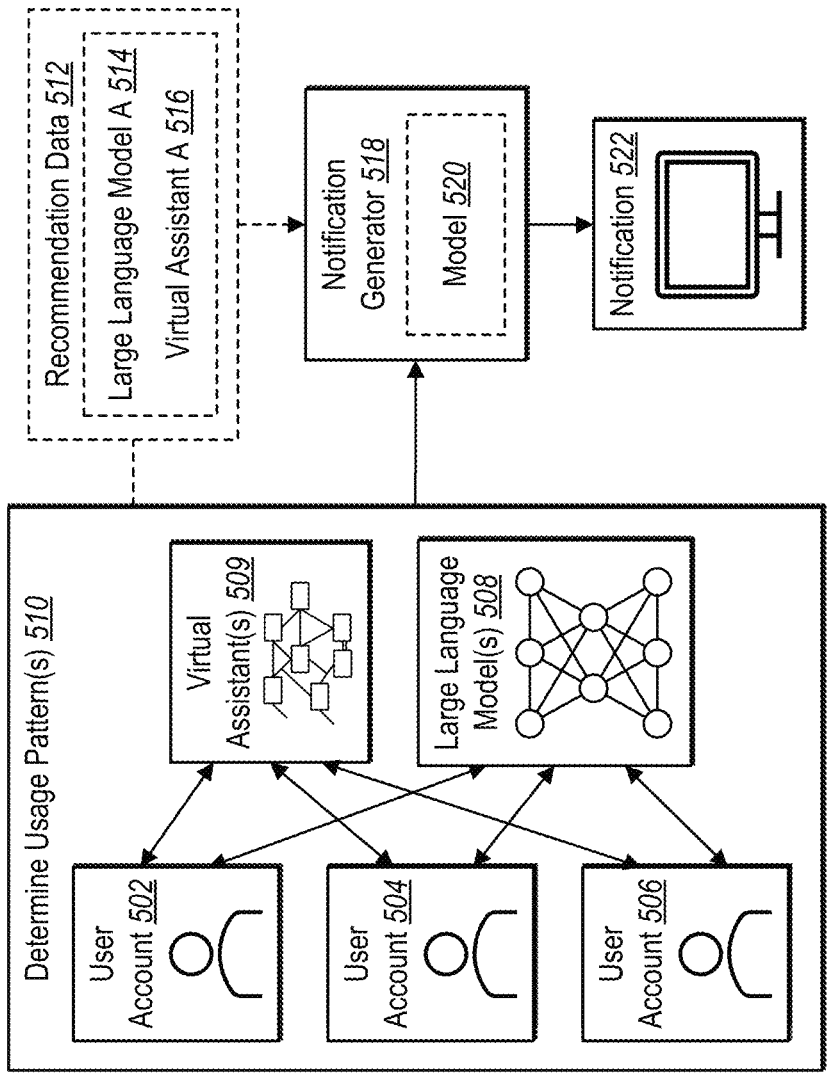
FIG. 5 illustrates the model modification system determining usage patterns for a large language model and providing a corresponding notification in accordance with one or more embodiments.

In addition to determining access patterns for content items accessed by user accounts, the model modification system 102 can determine usage patterns of the one or models (e.g., LLMs or virtual assistants) permitted access to content items 418 stored on the content management system 414. Indeed, the model modification system 102 can use the usage patterns to inform model (e.g., LLM and/or virtual assistant) recommendations. FIG. 5 illustrates the model modification system 102 determining usage patterns to generate a notification corresponding to a model in accordance with one or more embodiments.

As illustrated in FIG. 5, the model modification system 102 can perform act 510 to determine usage patterns of one or more LLM(s) 508 and or one or more virtual assistant(s) 509. Specifically, the model modification system 102 can determine usage patterns by the user accounts (e.g., a user account 502, a user account 504, and/or a user account 506, among others), where the usage patterns indicate timestamps and functions of applying the LLM(s) 508 and/or the virtual assistant(s) 509 including indications of periodicity, recency, and/or frequency of applying or using the respective LLM(s) 508 and/or virtual assistant(s) 509 (where the indications can be function specific). For example, the model modification system 102 can determine which LLMs (and/or which virtual assistant(s)) of the one or more LLM(s) 508 (and/or of the one or more virtual assistant(s) 509) are utilized by the user accounts to perform tasks of different types.

For example, the model modification system 102 can utilize data from an observation layer and/or user interaction data encoded in the knowledge graph to determine aspects of a usage pattern, such as a correlation between types of inputs received by the LLM(s) 508 and/or the virtual assistant(s) 509. Indeed, the model modification system 102 can utilize the knowledge graph to determine that the user accounts provide a first type of input to a first LLM (and/or a first virtual assistant). Moreover, the model modification system 102 can utilize the knowledge graph to determine that the user accounts provide a second type of input to a second LLM (and/or to a second virtual assistant), and a third type of input to a third LLM (and/or to a third virtual assistant), including timestamps and/or indications of periodicity, recency, and/or frequency of the inputs. Indeed, as part of act 510, the model modification system 102 can determine a correlation between input(s) received from the user accounts by the LLM(s) (and/or the virtual assistant(s)) and functionalities performed by the LLM(s) (and/or by the virtual assistant(s)).

Indeed, as part of act 510, the model modification system 102 can utilize a knowledge graph (e.g., the knowledge graph of FIG. 3) to determine usage patterns between user accounts and the LLM(s) 508 (and/or between user accounts and the virtual assistant(s) 509). Specifically, the model modification system 102 can generate, update or modify edges in the knowledge graph based on usage patterns of the one or more LLM(s) (and/or based on usage patterns of the one or more virtual assistant(s)). In some cases, the model modification system 102 can generate usage pattern edges to represent connections between the nodes in the knowledge graph. In some embodiments, the model modification system 102 can utilize the usage patterns determined as a part of act 510 to modify existing edges to indicate relationships between nodes (e.g., representing user accounts, content items, LLMs, and/or virtual assistant(s)).

Additionally, the model modification system 102 can determine a model 520 (e.g., an LLM and/or a virtual assistant) from among the one or more LLMs and/or virtual assistants for the user account 502 (e.g., a node of the first type) according to the usage patterns of the model 520 by the user accounts. Moreover, the model modification system 102 can determine a usage recommendation of the model 520 (e.g., an LLM and/or a virtual assistant) for the user account 502 according to the usage patterns of the model 520 by the user accounts.

Moreover, as illustrated in FIG. 5, in some embodiments, the model modification system 102 can determine recommendation data 512 to inform a model (e.g., an LLM and/or a virtual assistant) recommendation. The notification generator 518 can thus utilize the recommendation data 512 when generating the notification 522. The recommendation data 512 can include information about models (e.g., LLM A 514 and/or Virtual Assistant A 516), such as one or more functionalities of LLM A 514 and/or Virtual assistant A 516. The model modification system 102 can also store data from previously generated notifications as recommendation data 512. As part of the recommendation data 512, the model modification system 102 can determine input patterns of content items into the one or more large language models, including timestamps, periodicity, frequency, and/or recency of content item input (specific to individual content items or content item types). Indeed, the model modification system 102 can determine types of content items that are input into the one or more LLMs. The model modification system 102 can compare the types of content items input into different models (e.g., LLMs and/or virtual assistants). The model modification system 102 can also compare the types of content items input into the one or more models (e.g., LLMs and/or virtual assistants) to the types of content items accessed by the user account. Based on the comparison(s), along with other recommendation data 512, usage patterns, access patterns, and/or other knowledge graph data, the model modification system 102 can determine a large language model from among the one or more large language models for use by the user account.

Indeed, as illustrated in FIG. 5, the model modification system 102 can utilize a notification generator 518 to generate a notification 522 corresponding to the model 520 (e.g., an LLM and/or a virtual assistant) the model modification system 102 determined according to act 510 (e.g., according to the usage patterns). The model modification system 102 can utilize the notification 522 to indicate that the model 520 is a new suggestion for the user account 502. Additionally, in some embodiments, the model modification system 102 can generate a second notification including a usage recommendation of the model 520 (e.g., the LLM and/or the virtual assistant). Specifically, the model modification system 102 can generate the second notification to propose a way for the user account 502 to utilize the model 520.

Figure 6:
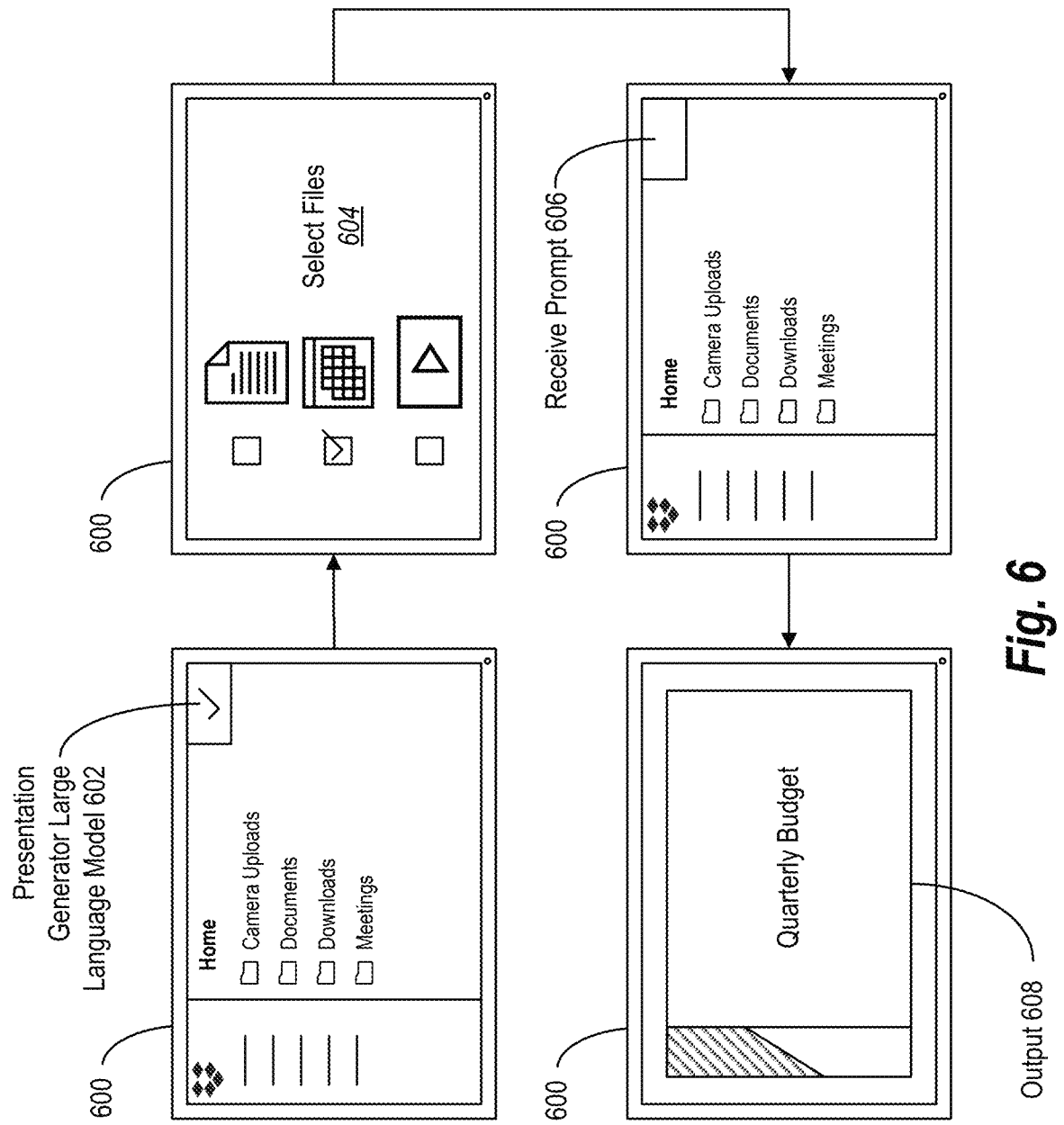
FIG. 6 illustrates an example interface for utilizing a retrieval augmented generation large language model in accordance with one or more embodiments.

As previously mentioned, the model modification system 102 can utilize a retrieval augmented generator (RAG) as a type of LLM for generating particular outputs or performing certain tasks. Indeed, the model modification system 102 can generate a recommendation of a RAG to provide to a client device and can further guide the client device through an authorization process to enable the RAG to access content items for retrieval. FIG. 6 illustrates an example diagram of authorizing a RAG to access particular content items for performing a task in accordance with one or more embodiments.

As illustrated in FIG. 6, the model modification system 102 can recommend a RAG for selection in a user interface of a client device, based on the factors described above. Specifically, the model modification system 102 can present an option to join a particular RAG, such as a Presentation Generator LLM 602 in the user interface of the client device 600. As depicted, the model modification system 102 can receive a selection of the join option. Responsive to receiving the selection, the model modification system 102 can add the user account to a set of user accounts permitted to access the Presentation Generator LLM 602.

The model modification system 102 can determine that the Presentation Generator LLM 602 is a RAG. The Model modification system 102 can make this determination prior to or subsequent to presenting the option to join the Presentation Generator LLM 602 in the client device 600. Responsive to determining that the Presentation Generator LLM is a RAG, and therefore that the Presentation Generator LLM 602 needs access to various content items stored within the content management system. Accordingly, based on receiving a selection to join, the model modification system 102 can display a notification 604 for the user account to select files for the Presentation Generator LLM 602 to access to perform tasks as indicated by the model modification system 102 and/or the user account. Specifically, according to the selected files, the model modification system 102 can retrieve data from content items stored in the content management system. The model modification system 102 can cause the Presentation Generator LLM 602 to extract, manipulate, supplement, retrieve, or otherwise interact with the selected files autonomously (e.g., the model modification system 102 can cause the Presentation Generator LLM 602 to periodically interact with the selected files), Additionally, the model modification system 102 can cause the Presentation Generator LLM 602 can receive a prompt 606 from the user account.

Indeed, to use the Presentation Generator LLM 602, the model modification system 102 can receive a prompt 606 from the user account indicating or defining a task for the Presentation Generator LLM 602 to complete (e.g., an output 608 for the Presentation Generator LLM 602 to generate), such as "Generate a presentation for my upcoming meeting summarizing the budget changes." Responsive to receiving the prompt 606, the model modification system 102 can cause the Presentation Generator LLM to analyze, extract, manipulate, or otherwise interact with the selected files. In some embodiments, the model modification system 102 can determine that the Presentation Generator LLM 602 needs access to additional files in order to generate the output 608 according to the prompt 606. Accordingly, the model modification system 102 can display a second notification in a file selection interface on the client device 600 indicating for a user account to select additional files for the Presentation Generator LLM 602 to access.

The model modification system 102 can cause the Presentation Generator Large Language Model to generate the output 608 according to the prompt 606. Specifically, the model modification system 102 can generate the output 608 utilizing retrieval augmented generation. For example, the output 608 can be a Microsoft PowerPoint presentation. The model modification system 102 can display the output 608 on the client device 600 associated with the client device.

Moreover, in some embodiments, the model modification system 102 can utilize a virtual assistant instead of or in conjunction with an LLM. For example, instead of generating an indication to join a presentation generator LLM (or any other LLM), the model modification system 102 can generate an indication to join a presentation generator virtual assistant (or any other virtual assistant). Indeed, responsive to receiving an interaction with the prompt to join the presentation generator virtual assistant, the model modification system 102 can generate a plurality of user-interface elements selectable to allow the presentation generator virtual assistant to access content items associated with a user account within an LLM, and can automatically generate outputs, such as presentations, based on one or more usage patterns, access patterns, or other factors the model modification system 102 determines.

Although not illustrated in FIG. 6, in some embodiments, rather than utilizing RAG, the model modification system 102 can implement and/or update the model (e.g., the LLM and/or the virtual assistant) utilizing fine-tuning approaches. For example, the model modification system 102 can generate, aggregate, and/or otherwise acquire a dataset specific to a domain (such as presentation generation. The model modification system 102 can determine to label, clean, and/or otherwise process the dataset. Indeed, the model modification system 102 can utilize the dataset to update parameters of the model (e.g., the LLM and/or the virtual assistant). For example, the model modification system 102 can utilize various finetuning approaches to finetune the model, such as full fine-tuning, layer-wise fine-tuning, feature-wise fine-tuning, adapter tuning, low-rank adaptation, prefix tuning, prompt tuning, parameter-efficient finetuning, multi-task finetuning, or domain-adaptive pretraining, among others.

Figure 7:
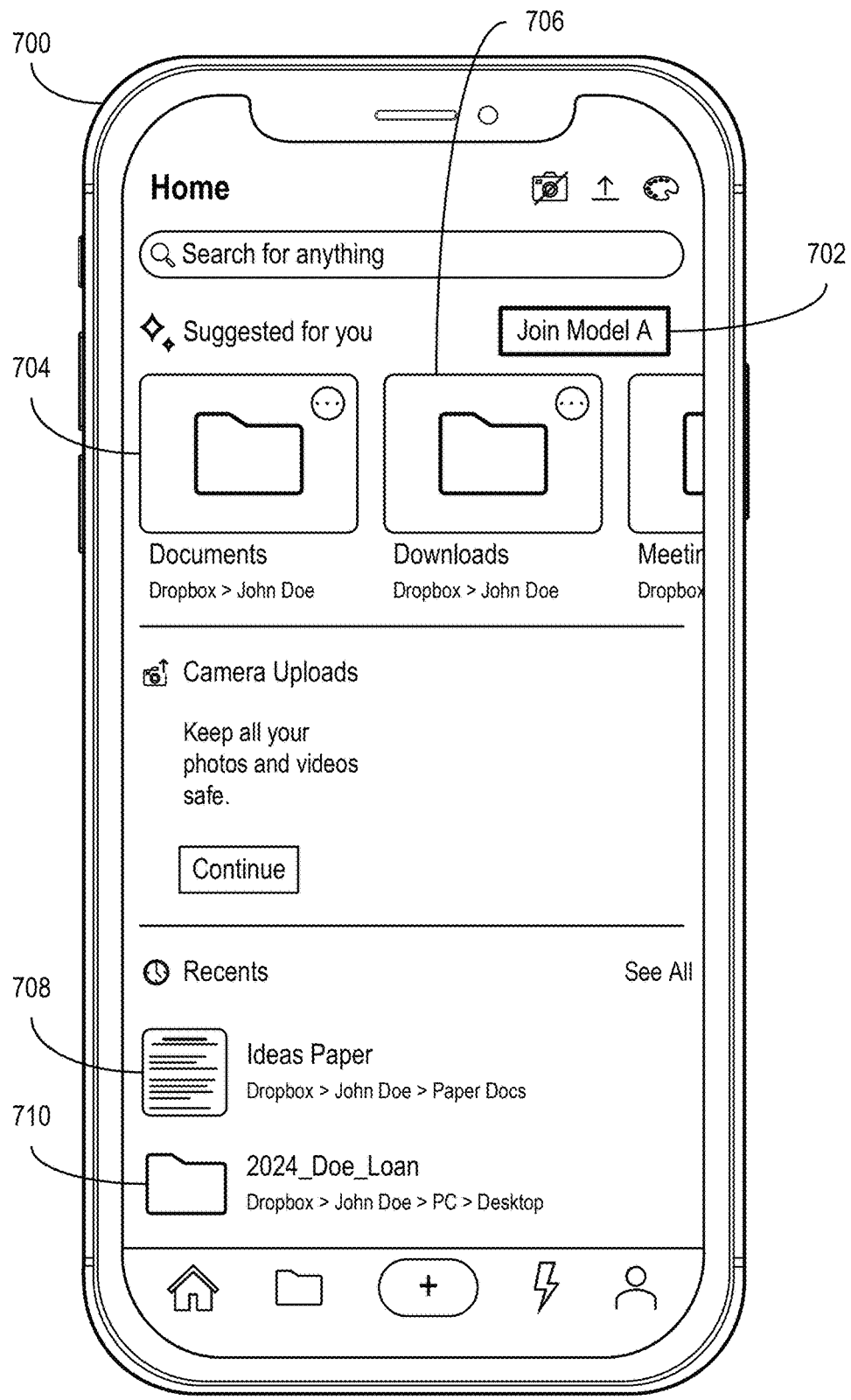
FIG. 7 illustrates an example interface for receiving a notification corresponding to a model in accordance with one or more embodiments.

As previously mentioned, the model modification system 102 can provide a notification corresponding to a model (e.g., an LLM and/or a virtual assistant). Indeed, the model modification system 102 can recommend that a user account join an LLM based on the factors described herein. FIG. 7 illustrates the model modification system 102 providing a notification corresponding to a model in accordance with one or more embodiments.

As illustrated, FIG. 7 shows the model modification system 102 providing a notification 702 to join a model (e.g., LLM A and/or virtual assistant A) in a user interface of a client device 700 (e.g., a smartphone). LLM A can be the LLM determined by the model modification system 102 determined in FIGS. 1-5, and virtual assistant A can be the virtual assistant determined by the model modification system 102 in FIGS. 1-5. Further, FIG. 7 displays content items 704, 706, 708, and 710. The model modification system 102 can provide a notification 702 that is selectable by a user account associated with the client device 700. The notification 702 can be a button, or a push notification, or a pop up. Additionally, although FIG. 7 depicts the client device 700 as a smartphone, in other embodiments, the client device can be a computer, a tablet, or another device, and the model modification system 102 can display the notification 702 as a button, a push notification, pop-up, or other type of notification suitable to the client device 700.

Indeed, the model modification system 102 can detect the content items 704, 706, 708, and 710 displayed on the user interface of the client device 700. The model modification system 102 can determine to provide the notification 702 to join model A (e.g., LLM A and/or virtual assistant A) according to the detected content items 704, 706, 708, and 710. Indeed, the model modification system 102 can utilize an observation layer (such as the observation layer of FIG. 3), to monitor activities of the client device 700, and determine the model to provide in the notification 702 according to the activities or other data from the observation layer.

Additionally, while not shown in FIG. 7, in some embodiments, the model modification system 102 can recommend at least one LLM and/or at least one virtual assistant to a user account. Indeed, the model modification system 102 can generate recommendations for an LLM and a virtual assistant in tandem according to usage patterns and/or access patterns the model modification system 102 determines. Indeed, the model modification system 102 can determine one or more relationships between the LLM and the virtual assistant, and generate a notification including a description of the one or more relationships to provide in a user interface of a client device.

Moreover, while not shown in FIG. 7, in some implementations, the model modification system 102 can implement a feedback mechanism. That is to say, based on recommending an LLM and/or virtual assistant to a user account, the model modification system 102 can solicit feedback from the user account regarding a quality level and/or a satisfaction level with the LLM/virtual assistant. Indeed, as previously discussed, the model modification system 102 can determine one or more access patterns and/or one or more usage patterns and generate a recommendation for an LLM and/or virtual assistant according to the one or more access patterns and/or one or more usage patterns. The model modification system 102 can request feedback for the recommendation based on the one or more access patterns and/or one or more usage patterns. For example, the model modification system 102 can determine that a user account accesses many content items associated with medical records (e.g., one or more access patterns). Based on this determination, the model modification system 102 can generate a recommendation for the user account for a medical diagnostic virtual assistant. The model modification system 102 can generate an invitation for the user account to the medical diagnostic virtual assistant. Moreover, the model modification system 102 can determine usage patterns of the medical diagnostic virtual assistant for the user account. Indeed, based on the usage patterns, the model modification system 102 can request feedback from the user account regarding the usage patterns of the medical diagnostic virtual assistants. In some embodiments, the model modification system 102 can request feedback from the user account according to other factors, such as a level of frequency the user account interacts with the medical diagnostic virtual assistant, or feedback the model modification system 102 receives from another user account regarding the medical diagnostic virtual assistant, among others.

Additionally, while not shown in FIG. 7, in some embodiments, the model modification system 102 can generate (e.g., train) a virtual assistant and assign one or more specific traits to the virtual assistant. As used herein, the term "specific traits" (sometimes hereinafter referred to as "trait(s)" refers to operational characteristics of a virtual assistant and/or operational objectives for a virtual assistant. The model modification system 102 can determine the one or more specific traits from a knowledge graph, or the model modification system 102 can determine the one or more specific traits via input from a user account. Moreover, a trait can be a workflow defining characteristic of a virtual assistant. Indeed, a trait can be a specific functionality that the virtual assistant autonomously performs according to access permissions provided to the virtual assistant by the model modification system 102. For example, the model modification system 102 can generate a virtual assistant and assign an efficiency trait to the virtual assistant. Phrased differently, the model modification system 102 can train a virtual assistant to improve the operational efficiency of an organization (e.g., a business unit or subunit, such as user accounts of a team). As another example, the model modification system 102 can generate a virtual assistant and assign a birthday trait to the virtual assistant (e.g., the virtual assistant secures birthday presents for designated user accounts). Additionally, the model modification system 102 can generate a virtual assistant and assign a task trait to the virtual assistant (e.g., the model modification system 102 can designate one or more tasks for the virtual assistant to accomplish, such as research).

Figure 8:
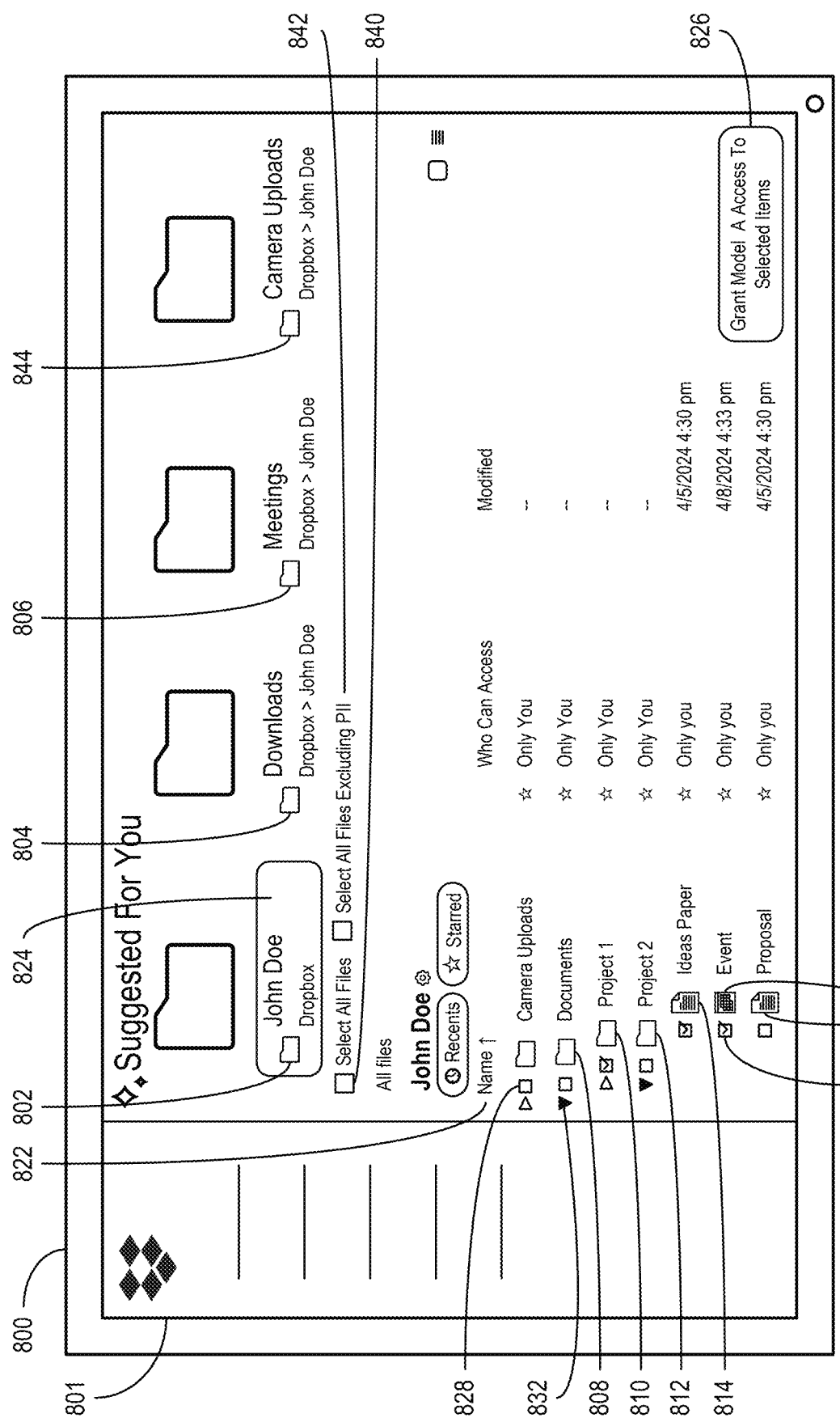
FIG. 8 illustrates an example interface for permitting a model to access specific content items in accordance with one or more embodiments.

As previously mentioned, the model modification system 102 can provide an interface to permit a large language model to access specific content items in accordance with one or more embodiments. Indeed, the model modification system 102 can determine that a model (e.g., an LLM and/or a virtual assistant) joined by a user needs access to content items and can provide an interface for authorizing such access. FIG. 8 illustrates an example user interface for permitting a large language model to access specific content items in accordance with one or more embodiments.

As illustrated, FIG. 8 shows a content selection interface 801 of a client device 800 associated with a user account. The model modification system 102 can display a plurality of content items: 802, 804, 806, 808, 810, 812, 814, 816, 818, and 844. The model modification system 102 can include an expand option 832 selectable to expand the contents of the content item (e.g., a drop-down menu). The model modification system 102 can generate a plurality of user-interface elements 824, 828, and 830 selectable to indicate permission for the model (e.g., an LLM and/or a virtual assistant) to access the content items. User-interface elements 828 and 830 are a selectable box to the left of their respective content items, whereas user-interface element 824 is a selectable name of content item 802 (e.g., rather than receiving a selection of a box as indicated by user-interface element 830, in some embodiments the model modification system 102 can receive a selection of a name of the user-interface element 824 as shown in FIG. 8). Indeed, in some embodiments, the model modification system 102 can generate a user interface selectable to organize a display of the content items 822, such as by name as illustrated in FIG. 8.

In some embodiments, the model modification system 102 can receive one or more interactions through the content selection interface and permit the model (e.g., an LLM and/or a virtual assistant) access to one or more of the content items according to the one or more interactions. For example, the model modification system 102 receives interactions with the user-interface elements 824 selectable to indicate permission for the model to access the content items (indicated by the box around the name of the content item 802) and 816 (indicated by the checked box to the left of content item 816). Based on receiving the interactions with the user-interface elements 824 and 830 selectable to indicate the model modification system 102 can generate a user-interface element selectable 826 to confirm the received interactions (e.g., a consent indication from the user account). The model modification system 102 can receive an interaction with the user-interface element 826 selectable to confirm the received interactions.

Additionally, as illustrated, in some embodiments, the model modification system 102 can generate, in the content selection interface 801, a first user-interface element 840 selectable to indicate permission for the model (e.g., an LLM and/or a virtual assistant) to access all content items associated with the user account within the content management system. Indeed, the model modification system 102 can determine to provide the first user-interface element 840 according to access patterns the model modification system 102 determines, usage patterns the model modification system 102 determines, or other factors.

Moreover, as illustrated, in some embodiments, the model modification system 102 can generate, in the content selection interface 801, a first user-interface element 842 selectable to allow the model (e.g., an LLM and/or a virtual assistant) to access all content items associated with the user account within the content management system excluding content items that include personal identifying information (PII). Indeed, in some embodiments, the model modification system 102 can determine content items within the content management system that contain PII. Indeed, in some embodiments, the model modification system 102 can determine to generate the first user-interface element 842 according to the model (e.g., the model modification system 102 can determine what inputs and/or data the LLM and/or the virtual assistant receives and/or what functionalities the model performs).

Moreover, in some embodiments, the model modification system 102 can include both a first user-interface element selectable to include all files and a second user-interface element selectable to include all files excluding PII in the content selection interface 801.

Indeed, by requiring interaction with selectable user-interface elements (e.g., 824, 826, 830, 840, 842) to grant a model (e.g., an LLM or a virtual assistant) access to content items associated with a user account within a content management system, the model modification system 102 improves the functionality and security of implementing systems by providing an additional firewall to prevent models from acquiring unauthorized access to content items within the content management system.

Indeed, in some embodiments, the model modification system 102 can determine to exclude unselected content items (e.g., selectable user-interface elements associated with content items within the content selection interface) from actions performed by the model modification system 102 (e.g., actions that the model modification system 102 causes an LLM and/or a virtual assistant to perform). For example, the model modification system 102 can determine to verify that the model is not accessing, utilizing, or otherwise interfacing with content items within the content management system unless the model modification system 102 has received an indication indicating permission for the model to access the content item.

In many cases, models (e.g., LLMs and/or virtual assistants) are account-specific and have access to only the content items expressly granted permission by a user account or a group of user accounts. A model, in some cases, cannot access private data for other, unaffiliated user accounts. The model modification system 102 can (via the user-interface element 826) exchange data between different LLMs and/or grant access to data of additional user accounts, expanding the data from which the LLM can generate responses. Thus, after a user account joins a model, the model modification system 102 can further enable the model to access the user account's data for generating responses specific to the user account. In some cases, by granting a model access to selected content items specific to a user account, the model modification system 102 expands the functionality of the model for all user accounts that are joined to the model (using the new user account data), while in other cases the model modification system 102 spins up a new instance of the model specific to the user account while the other joined user accounts have their own respective instances.

Figure 9:
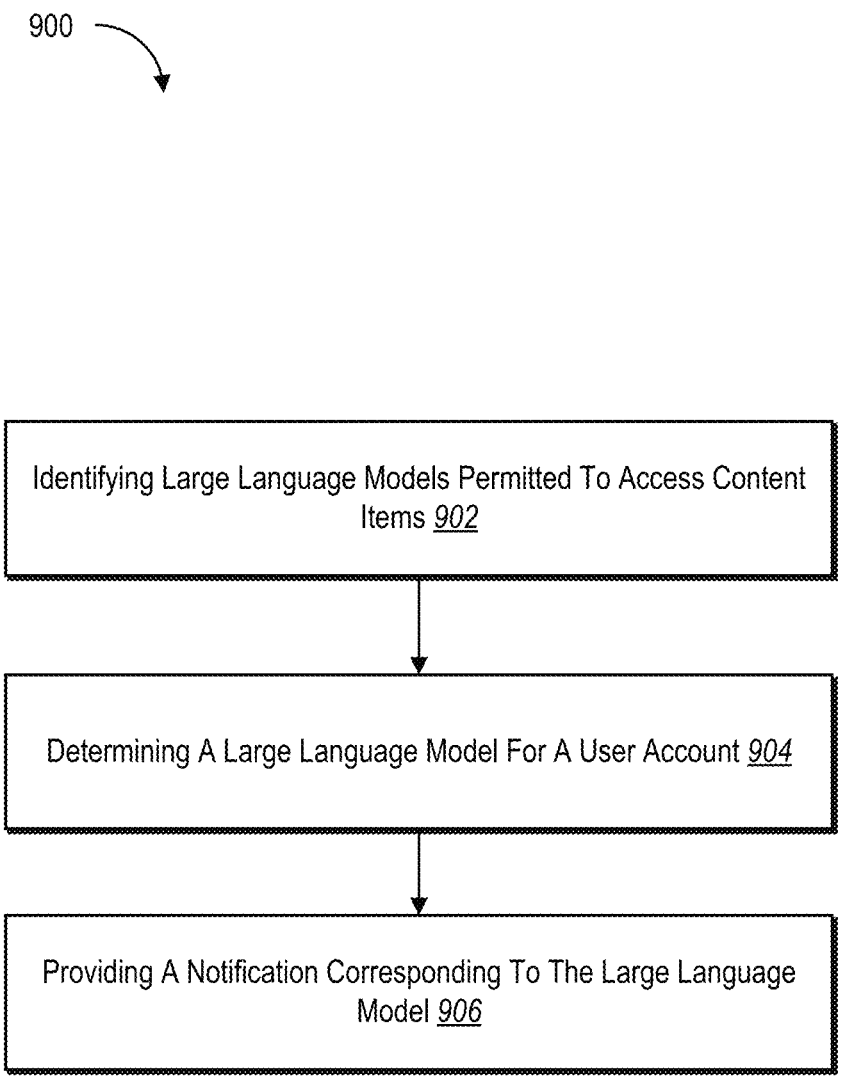
FIG. 9 illustrates an example flowchart of a series of acts for determining a large language model from among one or more large language models in accordance with one or more embodiments.
Figure 10:
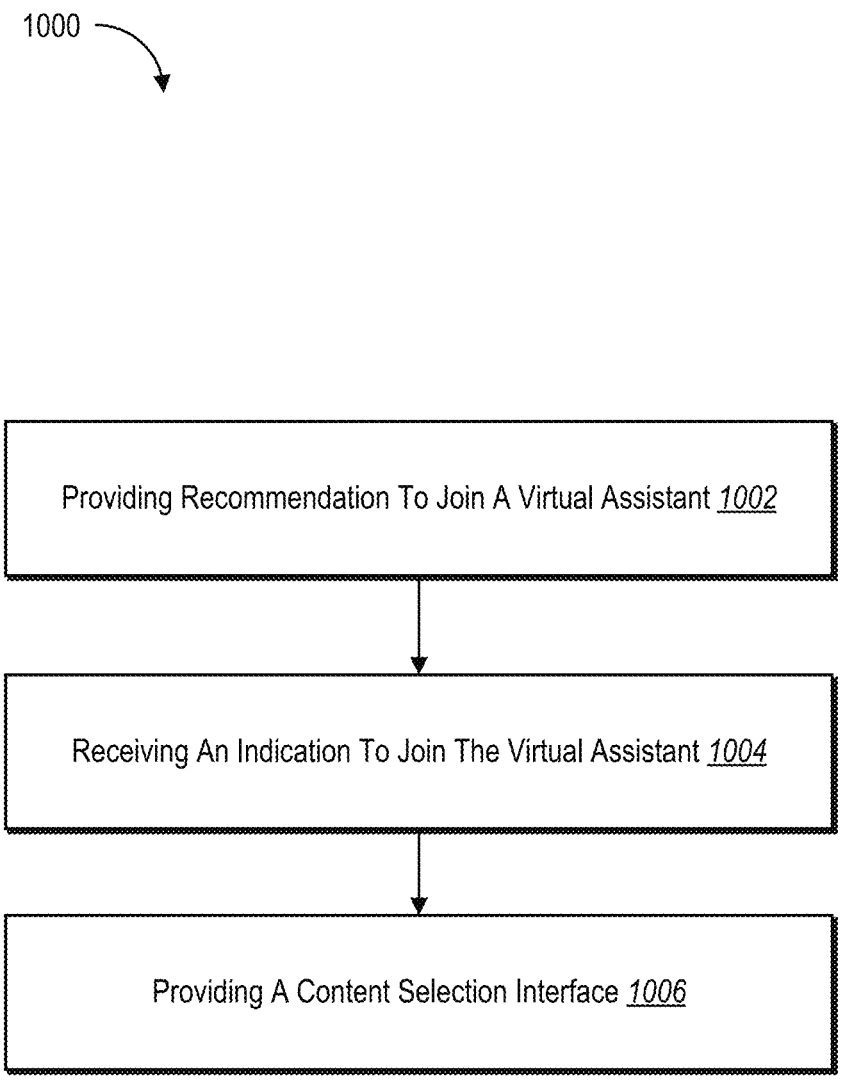
FIG. 10 illustrates an example flowchart of a series of acts for determining a virtual assistant and providing the virtual assistant access to content items within a content management system.

FIGS. 1-8, the corresponding text, and the examples provide a number of different systems and methods for generating and providing a recommendation for a model (e.g., an LLM and/or a virtual assistant) for a user account. In addition to the foregoing, implementations can also be described in terms of flowcharts comprising acts or steps in a method for accomplishing a particular result. For example, FIG. 9 illustrates an example series of acts for generating and providing an LLM (and/or a virtual assistant) recommendation for a user account in accordance with one or more embodiments, and FIG. 10 illustrates an example series an example series of acts for determining a virtual assistant (and/or an LLM) and providing the virtual assistant (and/or the LLM) access to content items within the content management system While FIG. 9 illustrates acts according to certain implementations, alternative implementations may omit, add to, reorder and/or modify any of the acts shown in FIG. 9. The acts of FIG. 9 can be performed as part of a computer-implemented method. Alternatively, a non-transitory computer readable medium can comprise instructions, that when executed by one or more processors, cause a computing device to perform the acts of FIG. 15. In still further implementations, a system can perform the acts of FIG. 9.

As illustrated in FIG. 9, the series of acts 900 may include an act 902 of identifying large language models (and/or virtual assistants) permitted to access content items. In particular, the act 902 can include identifying one or more large language models (and/or virtual assistants) permitted to access content items stored for user accounts stored within a content management system. In addition, the series of acts 900 can include an act 904 of determining a large language model (and/or a virtual assistant) for a user account. In particular, the act 904 can include determining, for a user account within the content management system, a large language model (and/or a virtual assistant) available to the user account from among the one or more large language models (and/or from among the one or more virtual assistants) permitted to access the content items stored for the user accounts within the content management system. Further, the series of acts 900 can include an act 906 of providing a notification corresponding to the large language model (and/or a virtual assistant). In particular, the act 906 can include, based on determining the large language model available to the user account (and/or based on determining the virtual assistant available to the user account), providing a notification corresponding to the large language model (and/or corresponding to the virtual assistant) for display on a client device of a user account.

In some embodiments, the act 904 further includes determining, utilizing a knowledge graph of the content management system, relationships between the user account and the user accounts. Moreover, in some embodiments, the act 904 further includes determining, utilizing the knowledge graph, relationships between the user accounts and the one or more large language models (and/or between the user accounts and the one or more virtual assistants). In some embodiments, the knowledge graph includes nodes representing the user accounts and the one or more large language models (and/or the one or more virtual assistants) and edges representing relationships between the user accounts and the one or more large language models (and/or relationships between the user accounts and the one or more virtual assistants).

Additionally, in some embodiments, the series of acts 900 further includes determining one or more functionalities of the large language model (and/or of the virtual assistant) and providing a second notification corresponding to the one or more functionalities. Indeed, the series of acts 900 can include an act of determining a first access pattern for a content item accessed by the user account, determining a second access pattern for the content item accessed by an additional user account, and determining the large language model (and/or the virtual assistant) according to a comparison of the first access pattern and the second access pattern. Indeed, in some embodiments the series of acts 900 further includes an act of determining a second large language model (and/or a second virtual assistant) for the user account according to one or more interactions between the user account according to one or more interactions between the user account and the large language model (and/or according to one or more interactions between the user account and the virtual assistant).

In one or more embodiments, the series of acts 900 can include an act of identifying, within a content management system, one or more large language models (and/or one or more virtual assistants) authorized by user accounts to access content items stored within the content management system. Moreover, the series of acts 900 can include an act of determining, for a user account within the content management system, a large language model (and/or a virtual assistant) available to the user account from among the one or more large language models (and/or from among the one or more virtual assistants) permitted to access the content items stored for the user accounts within the content management system. Additionally, the series of acts 900 can include an act of providing, based on the determination of the large language model (and/or the virtual assistant) available to the user account, a notification corresponding to the large language model (and/or corresponding to the virtual assistant) for display on a client device of the user account.

Moreover, in some embodiments, the series of acts 900 can include an act of utilizing a knowledge graph of the content management system to determine relationships between the user account and the one or more large language models (and/or the one or more virtual assistants) utilized by the user accounts. Indeed, the series of acts 900 can include an act of generating a recommendation for the large language model (and/or for the virtual assistant) from among the one or more large language models (and/or from among the one or more virtual assistants) to provide to the user account based on the relationships between the user account and the one or more large language models (and/or based on the relationship between the user account and the one or more virtual assistants). Additionally, the series of acts 900 can include an act of determining relationships between the user account and the user accounts. Indeed, the series of acts 900 can include an act of determining the large language model (and/or the virtual assistant) according to the relationships between the user account and the user accounts.

In some embodiments, the series of acts 900 can include an act of generating, using the large language model (and/or the virtual assistant), a response to a prompt by retrieving data from the content items stored in the content management system and generating the response by using the large language model (and/or the virtual assistant) to analyze the data according to the prompt. Moreover, the series of acts 900 can include an act of authorizing, by the content management system, the one or more large language models (and/or the one or more virtual assistants) to access the items by receiving a consent indication from the user account.

In some embodiments, the series of acts 900 can include an act of determining one or more usage patterns of the large language model (and/or of the virtual assistant) by the user accounts. Indeed, the series of acts 900 can include an act of generating a second notification comprising a usage recommendation of the large language model (and/or of the virtual assistant) according to the one or more usage patterns.

In one or more embodiments, the series of acts 900 can include an act of identifying one or more large language models (and/or virtual assistants) permitted to access content items stored for user accounts within a content management system. Moreover, the series of acts 900 can include an act of determining, for a user account within the content management system, a large language model (and/or a virtual assistant) available to the user account from among the one or more large language models (and/or from among the one or more assistants) permitted to access the content items stored for the user accounts within the content management system. Additionally, the series of acts 900 can include an act 900 of providing, based on the determination of the large language model (and/or the virtual assistant) available to the user account, a recommendation for the large language model (and/or the virtual assistant) on a client device of the user account.

In some embodiments, the series of acts 900 can include an act of generating a user-interface element selectable to allow the user account to access the large language model (and/or the virtual assistant). Additionally, the series of acts 900 can include an act of generating a plurality of user-interface elements selectable to indicate permission for the large language model (and/or the virtual assistant) to access the content items. Indeed, the series of acts 900 can include an act of determining one or more usage patterns of the large language model (and/or the virtual assistant) by the user accounts. Moreover, the series of acts 900 can include an act of generating a second notification comprising a new usage of the large language model (and/or a new usage of the virtual assistant) by the user account according to the one or more usage patterns.

In one or more embodiments, the series of acts 900 can include an act of providing a content selection interface on the client device. Moreover, the series of acts 900 can include an act of receiving one or more interactions through the content selection interface. Indeed, the series of acts 900 can include an act of permitting the large language model (and/or the virtual assistant) access to one or more of the content items according to the one or more interactions. Additionally, the series of acts 900 can include an act 900 of determining a second large language model (and/or a second virtual assistant) for the user account according to one or more interactions between the user accounts and the large language model (and/or according to one or more interactions between the user accounts and the virtual assistant).

As previously mentioned, FIG. 10 shows a series of acts 1000 for determining a virtual assistant and providing the virtual assistant access to content items within a content management system. As illustrated in FIG. 10, the series of acts 1000 may include an act 1002 of providing a recommendation to join a virtual assistant. In particular, the act 1002 can include providing a recommendation to join a virtual assistant to a client device of a use account within a content management system. In addition, the series of acts 1000 can include an act 1004 of receiving an indication to join the virtual assistant. In particular, the act 1004 can include, based on providing the recommendation, receiving an indication to join the virtual assistant from the client device. Further, the series of acts 1000 can include an act 1006 of providing a content selection interface. In particular, the act 1006 can include, based on the indication to join the virtual assistant, providing, for display on the client device, a content selection interface for selecting content items accessible by the virtual assistant within the content management system.

In some embodiments, the series of acts 1000 further includes an act of generating, within the content selection interface, a user-interface element selectable to allow the user account to access the virtual assistant based on providing the recommendation. Moreover, in some embodiments, the series of acts 1000 can include an act of generating, within the content selection interface, a plurality of user-interface elements selectable to indicate permission for the virtual assistant to access the content items.

Additionally, in one or more embodiments, the content selection interface includes a first user-interface element selectable to indicate permission for the virtual assistant to access all content items associated with the user account within the content management system. Indeed, in some embodiments, the content selection interface includes a first user-interface element selectable to indicate permission for the virtual assistant to access all content items associated with the user account within the content management system excluding content items that include personal identifying information (PII).

In some embodiments, the series of acts 1000 includes excluding unselected content items from actions performed by the virtual assistant.

The following description of FIGS. 11-14 focuses on the model modification system 102 utilizing and adapting a virtual assistant to accomplish tasks for a user account. While this section of the description emphasizes the use of one or more virtual assistants, it will be understood that, where possible, this section also applies to the model modification system 102 utilizing LLMs to accomplish tasks for a user account.

Moreover, as previously discussed, it should be understood that a virtual assistant can be an agentic model that can utilize natural language processing and/or other machine learning techniques to perform tasks, provide information, and support decision-making processes. Indeed, an agentic model can include neural networks, speech recognition frameworks, decision making frameworks. Additionally, an agentic model can incorporate deep learning to achieve sophisticated pattern recognition and adaptability. Moreover, an agentic model can perform automated workflows for a user account.

Adapting Virtual Assistants

As previously mentioned, in some embodiments, the model modification system 102 can utilize a virtual assistant to accomplish a task for a user account. For example, FIG. 11 depicts the model modification system 102 coordinating a virtual assistant and an additional virtual assistant to accomplish a task for a user account in accordance with one or more embodiments.

Figure 11:
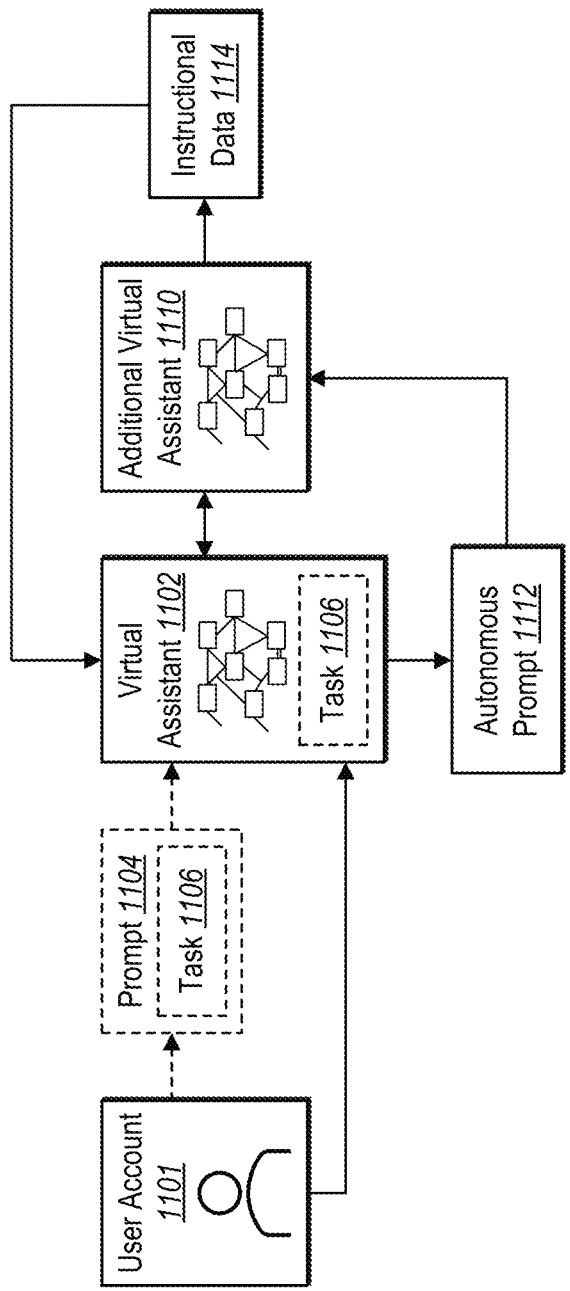
FIG. 11 illustrates an example overview of the model modification system coordinating a virtual assistant and an additional virtual assistant to accomplish a task for a user account in accordance with one or more embodiments.

As illustrated in FIG. 11, the model modification system 102 can generate and adapt a virtual assistant 1102 for a user account 1101. For instance, the model modification system 102 can assign a virtual assistant to a user account. As the virtual assistant 1102 performs tasks and generates or modifies content items for the user account over time, the model modification system 102 can update and adapt the virtual assistant 1102 to improve at the tasks of the user account. Different user accounts use their respective virtual assistants to perform different tasks (and the assistants have access to content items specific to respective user accounts), and the model modification system 102 can thus adapt virtual assistants to learn different parameters for different levels of accuracy or proficiency for different tasks (and from the different user-specific content). In some cases, the model modification system 102 can (depending on permissions) access virtual assistants of other user accounts to learn from and/or use the capabilities of other virtual assistants to perform tasks for a particular account (e.g., using the account's virtual assistant).

In just mentioned, in some embodiments, the model modification system 102 can generate the virtual assistant 1102 (e.g., the model modification system 102 can design and train the virtual assistant 1102). In some cases, the model modification system 102 can select the virtual assistant 1102 from a virtual assistant database (e.g., utilize a stock virtual assistant), and further modify the virtual assistant 1102 through methods such as fine-tuning over data available from a user account. Moreover, the model modification system 102 can receive, from a user account 1101, access permission to content items associated with the user account 1101 (e.g., content items hosted within a content management system and/or content items hosted on third party servers).

As illustrated in FIG. 11, in some embodiments, the user account 1101 can provide a prompt 1104 to the virtual assistant 1102 instructing the virtual assistant 1102 to perform a task 1106. For example, the prompt 1104 can be natural language text instructions the user account 1101 provides to the virtual assistant 1102 through a user interface. The task 1106 can be an objective for the virtual assistant 1102 to accomplish, such as creating, accessing, editing, summarizing, or otherwise interacting with a content item or a third-party data source.

As indicated by the dashed lines around the prompt 1104 and the task 1106, the model modification system 102 can optionally cause the prompt 1104 and task 1106 to be input to the virtual assistant 1102. Indeed, the model modification system 102 can cause the virtual assistant 1102 to analyze the prompt 1104 to determine the task 1106. Moreover, the model modification system 102 can extract or otherwise determine a function tag from the task 1106. In some cases, the model modification system 102 can determine, by analyzing the prompt 1104 that the virtual assistant 1102 is designated for different tasks than the task 1106 indicated by the prompt 1104.

Based on determining that the virtual assistant 1102 is designated for tasks other than the task 1106 (or that the virtual assistant 1102 would generate an output for the task 1106 with less than a threshold measure of accuracy), the model modification system 102 can identify an additional virtual assistant 1110 within the content management system designated for the task. Indeed, the model modification system 102 can utilize a knowledge graph (such as the knowledge graph of FIG. 3) to determine the additional virtual assistant 1110 designated for the task. For example, the model modification system 102 can determine function tags of virtual assistants within the content management system. The model modification system 102 can compare the function tags of the virtual assistants within the content management system with a function tag of the task 1106 to determine which virtual assistants are designated for completing the task 1106. In some cases, the model modification system 102 can represent a function tag of the task 1106 as an extracted embedding (e.g., a vector representation) of the task 1106, and the model modification system 102 can determine function tags for the virtual assistants within the content management system by extracting embeddings of virtual assistants. The model modification system 102 can determine the additional virtual assistant 1110 from among the virtual assistants by computing the cosine distances between the function tag of the task 1106 (e.g., the embedding of the task) and function tags of each of the virtual assistants (e.g., embeddings of the virtual assistants).

As shown in FIG. 11, responsive to identifying the additional virtual assistant 1110, the model modification system 102 can cause the virtual assistant 1102 to generate an autonomous prompt 1112 (e.g., autonomously generate a prompt without requiring any additional input from the user account 1101) instructing the additional virtual assistant 1110 to generate instructional data 1114 interpretable by the virtual assistant 1102 to complete the task 1106. In other words, the model modification system 102 can cause the additional virtual assistant 1110 to teach the virtual assistant 1102 to complete the task 1106 that the virtual assistant 1102 was not designated to complete or that the virtual assistant 1102 completes with less than a threshold degree of accuracy.

For example, the model modification system 102 can analyze the prompt 1104 to determine the task 1106 instructs creating a specific type of content item. Moreover, the model modification system 102 can extract a function tag from the task 1106. Indeed, the model modification system 102 can determine that the virtual assistant 1102 is designated for different tasks than creating the specific type of content item. For example, the model modification system 102 can assign function tags to the virtual assistant 1102 based on the virtual assistant 1102 achieving a threshold accuracy for a task. The model modification system 102 can compare function tags of the virtual assistant 1102 with the function tag of the task to determine that the virtual assistant 1102 does not have a function tag that matches the function tag of the task 1106 (e.g., the virtual assistant 1102 cannot complete the task 1106 at or above a threshold level of accuracy). The model modification system 102 can determine the additional virtual assistant 1110 within the content management system that is designated for creating the specific type of content item by extracting function tags of virtual assistants of the content management system and comparing (e.g., computing cosine similarities) the function tag of the task 1106 with function tags of the virtual assistants.

The model modification system 102 can utilize the virtual assistant 1102 to generate an autonomous prompt 1112 instructing the additional virtual assistant 1110 to generate the instructional data 1114 for the virtual assistant 1102 to complete the task 1106. For example, the model modification system 102 can cause the additional virtual assistant 1110 to generate the instructional data 1114 to enable the virtual assistant 1102 to complete the task 1106.

In some embodiments, the model modification system 102 can utilize the instructional data interpretable by the virtual assistant 1102 to update and/or otherwise modify parameters of the virtual assistant 1102 to complete the task 1106 without requiring instructional data from the additional virtual assistant 1110. Moreover, responsive to updating and/or otherwise modifying parameters of the virtual assistant 1102, the model modification system 102 can update a designation of the virtual assistant 1102 to indicate that the virtual assistant 1102 can perform the task 1106.

Moreover, in some embodiments, rather than (or in addition to) generating the autonomous prompt 1112 to cause the additional virtual assistant 1110 to generate the instructional data interpretable by the virtual assistant 1102 to complete the task, the model modification system 102 can cause the virtual assistant 1102 to generate the autonomous prompt 1112 instructing the additional virtual assistant 1110 to generate a response to the prompt (and/or to take an action to complete the task, such as in the case where the model modification system 102 causes the virtual assistant to autonomously determine a task to complete for a user account).

In some embodiments, the model modification system 102 can cause the virtual assistant 1102 to autonomously determine the task 1106 to perform for the user account 1101 (e.g., the model modification system 102 causes the virtual assistant 1102 to perform the task 1106 without requiring the virtual assistant 1102 to receive the prompt 1104). For example, the model modification system 102 can utilize event-driven architectures (e.g., serverless computing, edgestore, microservices, etc.) to monitor the content management system and content items associated with the user account 1101 within the content management system.

Indeed, the model modification system 102 can monitor various signals associated with the content management system and/or content items associated with the user account, such as changes in data (e.g., changes made to a content item and/or changes within the content management system) to trigger autonomous workflows. For example, the model modification system 102 can detect abnormal activity associated with a user account (such as abnormal access patterns and/or usage patterns) and autonomously trigger security protocols. Additionally, the model modification system 102 can leverage predictive and contextual analytics to forecast needs of the user account 1101 according to changes to a content item and/or within the content management system.

For example, the model modification system 102 can detect a creation of a new content item within the content management system. The model modification system 102 can autonomously determine (e.g., utilizing a knowledge graph) that the user account 1101 should receive permission to access and/or otherwise edit the new content item, and can autonomously request permission for the user account 1101. Additionally, according to detecting additional user accounts associated with the new content item, the model modification system 102 can autonomously determine related safeguarded content items associated with the user account and can autonomously request that the additional user accounts (and/or additional virtual assistants associated with the additional user accounts) receive permission to access the safeguarded content items.

Figure 12:
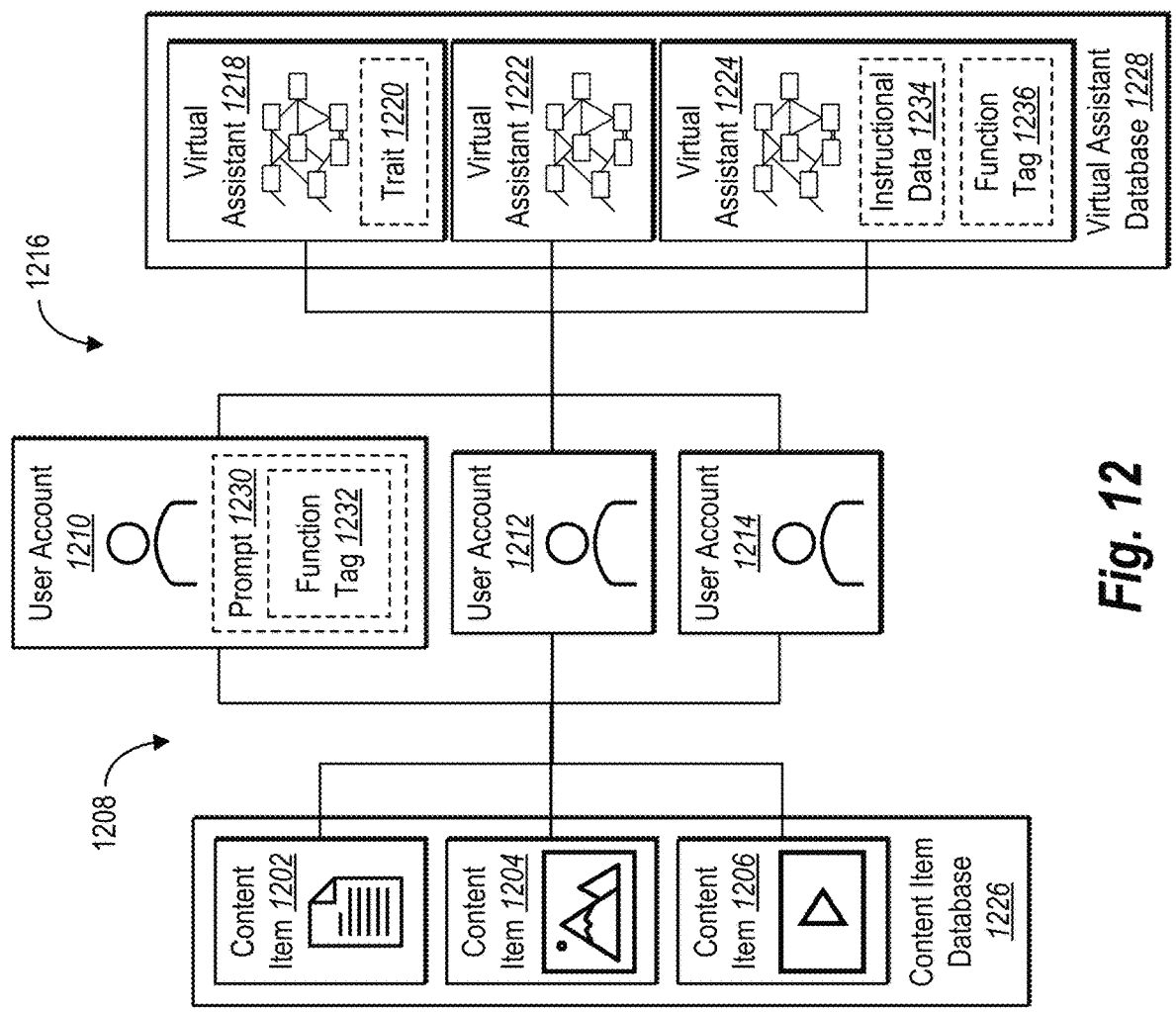
FIG. 12 illustrates an example of the model modification system determining access patterns of content items by user accounts, usage patterns of virtual assistants by user accounts, and assigning traits to virtual assistants in accordance with one or more embodiments.

As previously mentioned, the model modification system 102 can determine access patterns of content items by user accounts and usage patterns of virtual assistants by user accounts. The model modification system 102 can use the access patterns and/or the usage patterns to determine function tags for virtual assistants and/or to identify additional virtual assistants to use in performing a task. FIG. 12 illustrates the model modification system 102 determining access patterns, usage patterns, and utilizing the access patterns and usage patterns to generate virtual assistants for user accounts in accordance with one or more embodiments.

As shown in FIG. 12, the model modification system 102 can include a content item database 1226 that stores content items (e.g., a content item 1202, a content item 1204, a content item 1206, among others). Additionally, the model modification system 102 can include a virtual assistant database 1228 that stores and/or otherwise tracks virtual assistants (e.g., a virtual assistant 1218, a virtual assistant 1222, a virtual assistant 1224, among others) that interface with the content management system. Moreover, the model modification system 102 can determine relationships between user accounts (e.g., a user account 1210, a user account 1212, a user account 1214, among others) content items, and virtual assistants.

Indeed, as illustrated, the model modification system 102 can perform an act 1208 to determine access patterns of content items by user accounts (e.g., such as discussed in FIG. 4). For example, the model modification system 102 can determine that user accounts of a first type have higher rates of interaction (e.g., accessing, editing, creating, among others) of content items of a first type and/or a second type. Moreover, the model modification system 102 can determine additional facets of the access patterns, such as an average time of interaction (e.g., that a user account performs actions of a first type with a first type of content item at a first time, actions of a second type with the first type of content item at a second time, actions of a third type with a second type of content item at a third time, etc.), an average time of duration (e.g., an amount of time for a user account to complete an action of a specific type). Indeed, the model modification system 102 can generate function tags from the access patterns.

Additionally, as illustrated, the model modification system 102 can perform an act 1216 to determine usage patterns (e.g., as discussed above with regard to FIG. 4) of the virtual assistants by the user accounts. In addition to the usage patterns discussed with regard to FIG. 4, with regard specifically to relationships between user accounts and virtual assistants, usage patterns can also refer to tasks that the virtual assistants autonomously perform for the user accounts. For example, the model modification system 102 can determine a usage pattern from a prompt 1230 that the user account 1210 provides to the virtual assistant 1218. Indeed, the model modification system 102 can generate function tags from the usage patterns.

As used herein, the term "function tag" refers to a classification of a function associated with a task. The model modification system 102 can determine function tags for user accounts, for virtual assistants, and/or for tasks from prompts. For example, a function tag can be an embedding of a user account, a virtual assistant, or a task. In some instances, a function tag can be metadata describing a type of action or metadata describing an embedding of a user account, a virtual assistant, or a task. The model modification system 102 can generate function tags of a first type for content items, function tags of a second type for user accounts, and function tags of a third type for virtual assistants. The function tags can indicate corresponding function tags of other types (e.g., a function tag of a first type can indicate a type of content item, types of actions performed on the content item, as well as corresponding function tags of a second type for user accounts (e.g., that indicate the types of tasks performed by the user account) and/or corresponding function tags of a third type for virtual assistants to indicate interactions between the content items and user accounts and/or between the content items and virtual assistants).

Indeed, when a user account (e.g., the user account 1210) provides a prompt (e.g., the prompt 1230) to a virtual assistant (e.g., the virtual assistant 1218), the model modification system 102 can determine a task from the prompt 1230. Based on determining the task, the model modification system 102 can determine a function tag 1232 associated with the task. The model modification system 102 can compare the function tag 1232 for the task/prompt 1230 with function tags of the virtual assistant 1218. Based on comparing the function tag 1232 of the prompt 1230 with function tags of the virtual assistant, the model modification system 102 can determine that the virtual assistant 1218 is designated for different tasks than the task indicated by the prompt 1230.

For example, the model modification system 102 can determine that the virtual assistant 1218 cannot complete the task indicated by the prompt 1230 by determining that the virtual assistant achieves less than a threshold accuracy score (e.g., compared to a ground truth) for completing the task. The model modification system 102 can determine an additional assistant to complete the task by determining which virtual assistant from the virtual assistant database 1228 has the highest accuracy score for completing the task.

Moreover, in some embodiments, the model modification system 102 can generate a virtual assistant for the user account 1210 by comparing function tags of virtual assistants in the virtual assistant database 1228 with function tags of the user account 1210 to determine a virtual assistant for the user account 1210. For example, the model modification system 102 can utilize a knowledge graph to determine access patterns and/or usage patterns for the user account 1210. The model modification system 102 can utilize the access patterns and/or usage patterns to determine function tags for the user account 1210. The model modification system 102 can compare function tags of the user account 1210 with function tags of virtual assistants of the virtual assistant database 1228 and determine a virtual assistant for the user account 1210 according to the function tags of the user account 1210 and the virtual assistants.

Additionally, as illustrated, the model modification system 102 can assign a trait 1220 to a virtual assistant (e.g., the virtual assistant 1218). In some embodiments, the model modification system 102 can assign the trait 1220 to the virtual assistant 1218 responsive to receiving input from the user account. Moreover, in some embodiments, the model modification system 102 can autonomously infer the trait 1220 according to properties (e.g., function tags) of the user account 1210, and autonomously assign the trait 1220 to the user account. Moreover, the model modification system 102 can adapt and update the virtual assistant by modifying or otherwise changing the trait 1220 assigned to the user account. For example, the model modification system 102 can cause the virtual assistant 1218 to trigger different autonomous workflows as the user account 1210 accesses different content items and/or performs different tasks over time.

Moreover, in some embodiments, the model modification system 102 can utilize multiple virtual assistants to accomplish a task for a user account. For example, the model modification system 102 can determine that the primary virtual assistant for the user account 1210 (e.g., the virtual assistant 1218 that the model modification system 102 generates for the user account 1210) is designated for tasks other than the task the model modification system 102 determines from the prompt. The model modification system 102 can determine an additional virtual assistant to execute the task by comparing a function tag 1232 of the prompt 1230 with function tags of the virtual assistants within the virtual assistant database (e.g., by computing cosine similarities of the function tag 1232 of the prompt with function tags of the virtual assistants). The model modification system 102 can determine a similarity between the function tag 1232 of the prompt 1230 and a function tag 1236 of the virtual assistant 1224 (e.g., the additional virtual assistant). Responsive to determining the similarity between the function tag 1232 of the prompt 1230 and the function tag 1236 of the virtual assistant 1224 (e.g., the additional virtual assistant), the model modification system 102 can cause the virtual assistant 1218 to generate an autonomous prompt instructing the additional virtual assistant to generate instructional data 1234 interpretable by the virtual assistant 1218 to complete the task of the prompt 1230.

Additionally, in some embodiments, the model modification system 102 can determine, by analyzing the prompt 1230, that the virtual assistant 1218 corresponds to an accuracy score less than a threshold accuracy score for performing the task. To determine an accuracy score for a task, the model modification system 102 can extract an embedding of the task and can determine its distance from previously extracted task embeddings. For instance, the model modification system 102 can generate a cluster of extracted task embeddings (e.g., as a group within a threshold embedding distance or cosine similarity) and can determine whether the embedding of the new task fits within the cluster.

The model modification system 102 can determine an accuracy score for the task by determining a distance of the task embedding from cluster centers of one or more task embedding clusters (or distances from individual task embeddings). If the model modification system 102 determines that the new task embedding is within a threshold distance of a task (or a cluster of tasks) performed correctly (e.g., based feedback and/or usage of data generated by performing the task), the model modification system 102 determines a higher accuracy score for the new task (and the accuracy score increases with closer distances to the previous task embedding). Conversely, if the model modification system 102 determines a far distance from an embedding of a correctly performed task (or a cluster) and/or determine a close distance from an incorrectly performed task (or a cluster), the model modification system 102 determines a lower accuracy score. The model modification system 102 determines lower accuracy scores for tasks whose embeddings are farther from those of correctly performed tasks and/or nearer to those of incorrectly performed tasks.

Based on determining that the virtual assistant 1218 corresponds to the accuracy score less than the threshold accuracy score, the model modification system 102 can identify an additional virtual assistant within the content management system corresponding to an additional accuracy score that satisfies the threshold accuracy score. For example, the model modification system 102 can compare the embedding of the task with embeddings of additional tasks previously completed by additional virtual assistants within the content management system. The model modification system 102 can determine an additional accuracy score that satisfies the threshold accuracy score for an additional virtual assistant (e.g., the virtual assistant 1222).

For example, the model modification system 102 can receive a prompt 1230 instructing the virtual assistant 1218 to perform a task, such as to generate a presentation from a data set. The model modification system 102 can extract an embedding of the task and compare it to embeddings of similar, previously completed tasks. Based on comparing the embedding of the task with the embeddings of the similar, previously completed tasks, the model modification system 102 can determine that the virtual assistant 1218 cannot complete the task with a threshold level of accuracy (e.g., the virtual assistant 1218 achieves less than the threshold level of accuracy when completing the task). Based on this determination, the model modification system 102 can compare the embedding of the task with other tasks completed by virtual assistants within the content management system.

For example, the model modification system 102 can compare the embedding of the task to generate a presentation from a data set with other, similar tasks of creating presentations from data sets completed by virtual assistants within the content management system. The model modification system 102 can utilize the embeddings of other tasks completed by virtual assistants to identify an additional virtual assistant (e.g., the virtual assistant 1222) that can meet and/or exceed the threshold accuracy score for performing the task.

Additionally, in some embodiments, the model modification system 102 can determine the accuracy score for the virtual assistant 1218 by providing the task to the virtual assistant 1218 and causing the virtual assistant 1218 to complete the task. That is to say, rather than determining the accuracy score by extracting an embedding of the task and comparing the embedding to other embeddings of tasks the model modification system 102 has caused the virtual assistant to complete, the model modification system 102 can determine the accuracy score by directly causing the virtual assistant 1218 to complete the task. The model modification system 102 can utilize the virtual assistant to complete the task. Moreover, based on the virtual assistant 1218 completing the task, the model modification system 102 can determine that the virtual assistant 1218 achieves less than the threshold accuracy score for performing the task (e.g., such as by comparing the completed task with a ground truth for the completed task to determine a measure of loss).

In some embodiments, the model modification system 102 can generate the autonomous prompt according to a trait assignment (e.g., the trait 1220 assigned to the virtual assistant 1218 by the user account 1210 or the model modification system 102). In some embodiments, the model modification system 102 can cause the virtual assistant 1218 to process the instructional data 1234 to execute a function to complete the task. Moreover, in some embodiments, the model modification system 102 can cause the virtual assistant 1218 to process the instructional data to complete the task by generating a response to the prompt 1230. Indeed, in some embodiments, the model modification system 102 can cause the virtual assistant 1218 to generate an autonomous prompt instructing the additional virtual assistant (e.g., the virtual assistant 1222) to generate a response to the prompt 1230.

Indeed, responsive to determining that the virtual assistant 1218 is designated for other tasks, the model modification system 102 can determine an additional virtual assistant to assist the virtual assistant 1218 in completing the task in a variety of ways. For example, the model modification system 102 can utilize usage patterns (e.g., the usage patterns determined as a result of the act 1216) of one or more virtual assistants (e.g., the virtual assistant 1222 and/or the virtual assistant 1224, among others) accessed by additional user accounts of the content management system (e.g., the user account 1212 and/or the user account 1214, among others) to determine the additional virtual assistant (e.g., the virtual assistant 1222). Further, based on determining the additional virtual assistant according to a usage pattern (e.g., an association between the additional virtual assistant and an additional user account), the model modification system 102 can identify safeguarded content items associated with the additional user account that contain data required to complete the task indicated by the prompt 1230. The model modification system 102 can request for the virtual assistant 1218 to receive access to the safeguarded content items. Along these same lines, the model modification system 102 can identify safeguarded content items associated with the user account containing data for completing the task indicated by the prompt 1230. The model modification system 102 can request permission for the additional virtual assistant to access the safeguarded content items.

For example, the model modification system 102 can determine that, in order for the virtual assistant 1218 to complete a task of a prompt 1230, the virtual assistant 1218 needs to access an Excel file associated with an additional user account (e.g., an Excel file that the user account 1212 and the virtual assistant 1222 have access to but that the user account 1210 and the virtual assistant do not have access to). Additionally or alternatively, the model modification system 102 can determine that, in order for the virtual assistant 1218 to complete the task, the additional virtual assistant (e.g., the virtual assistant 1222) needs to access a Word document associated with the user account 1210 (e.g., a Word document that the user account 1210 and the virtual assistant 1218 have access to but that the virtual assistant 1222 does not have access to). Accordingly, the model modification system 102 can request for the virtual assistant 1218 and the additional virtual assistant to receive access permissions to the respective files.

Moreover, in some embodiments, the model modification system 102 can determine to request to a part of a content item. For example, the model modification system 102 can determine that the content item 1202 contains personally identifying information (PII) as well as data for the virtual assistant 1218 to complete the task from the prompt 1230. The model modification system 102 can redact, restrict, or otherwise remove the PII from the content item 1202 before providing the virtual assistant 1218 or the virtual assistant 1222 (e.g., the additional virtual assistant) access to the content item.

Indeed, in this manner, the model modification system 102 can increase the privacy of conventional systems. By providing user interfaces to user accounts to enable the user accounts to selectively provide virtual assistants (and/or LLMs) access to content items within the content management systems, the model modification system 102 prevents virtual assistants (and/or LLMs) from accessing content items containing private, unnecessary, and/or extraneous information.

As previously mentioned, the model modification system 102 can generate user interfaces related to recommending virtual assistants and to requesting access to content items within the content management system. FIGS. 13A-D represent various user interfaces that the model modification system 102 can generate in accordance with one or more embodiments.

Figure 13C:
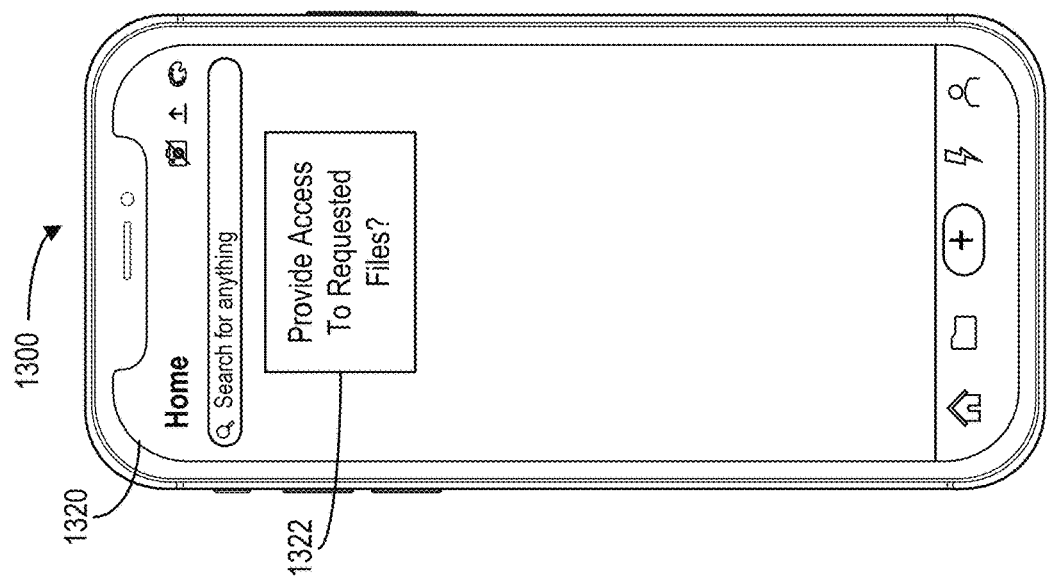
FIGS. 13A-D depicts user interfaces generated by the model modification system in accordance with one or more embodiments.
Figure 13B:
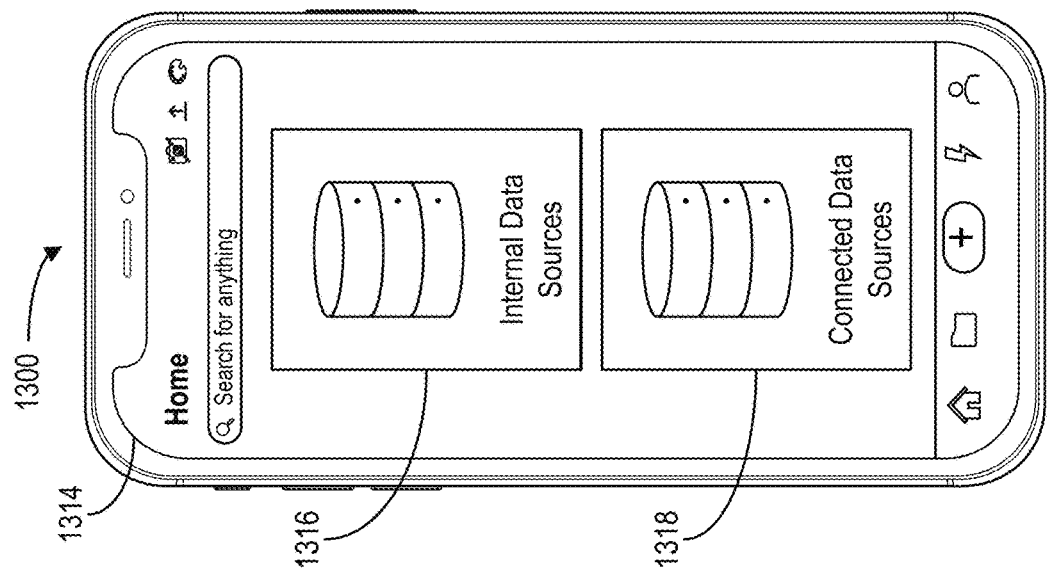
Figure 13A:
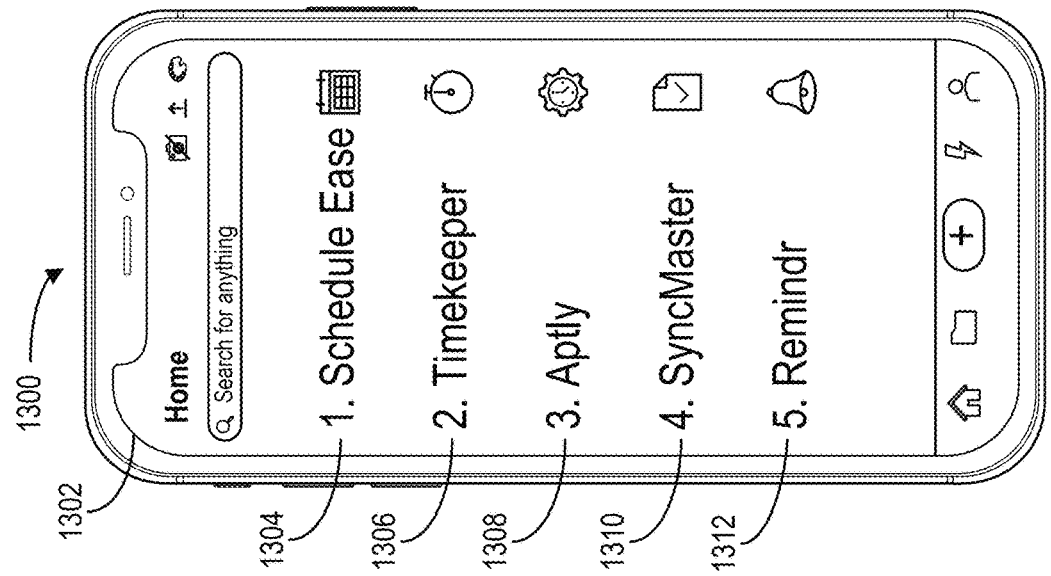

FIG. 13A illustrates a virtual assistant marketplace interface 1302 for depicting a ranked list of virtual assistants. Indeed, the model modification system 102 can generate a ranked list of virtual assistants for a user account. The model modification system 102 can generate the list in a plurality of ways. For example, the model modification system 102 can utilize a knowledge graph (such as the knowledge graph of FIG. 3) to generate a ranked list of virtual assistants for a user account according to similarities between the user account and additional accounts within the content management system. For example, the model modification system 102 can utilize the knowledge graph to determine, based on access patterns and/or usage patterns, shorter edges for virtual assistants to display via the virtual assistant marketplace interface 1302 in a client device. The ranked list can include a first suggested virtual assistant 1304 (e.g., Schedule Ease), a second suggested virtual assistant 1306 (e.g., TimeKeeper), a third suggested virtual assistant 1308 (e.g., Aptly), a fourth suggested virtual assistant 1310 (e.g., SyncMaster), and/or a fifth suggested virtual assistant 1312 (e.g., Remindr).

Additionally, the model modification system 102 can generate the ranked list of virtual assistants according to other factors, such as usage patterns. Indeed, prior to generating the ranked list, the model modification system 102 can request input from a user account regarding function tags and/or functionalities to prioritize in the ranked list.

While not illustrated in FIG. 13A, in some embodiments, the model modification system 102 can include an explanation for the ranked list in the virtual assistant marketplace interface. For example, the model modification system 102 can include one or more notifications explaining what criteria the model modification system 102 used to rank the virtual assistants, such as which access patterns, usage patterns, and/or other criteria the model modification system 102 utilized to generate the ranked list of virtual assistants. Moreover, the model modification system 102 can include a feedback mechanism in the virtual assistant marketplace interface to enable the model modification system 102 to generate more accurate ranked lists of virtual assistants.

As shown in FIG. 13B, the model modification system 102 can generate a virtual assistance interface 1314 for display in a client device 1300 that identifies sets of data accessed by virtual assistants within the content management system. For example, the model modification system 102 can identify a first set of data sources 1316 (e.g., databases, directories, and/or individual, discrete content items across multiple directories) associated with the user account accessed by the virtual assistant within the content management system. Additionally, the model modification system 102 can identify a second set of data sources 1318 associated with the user account accessed by the additional virtual assistant via connectors to external storage locations. The model modification system 102 can display the first set of data sources 1316 and the second set of data sources 1318 in the virtual assistance interface 1314. The model modification system 102 can generate the first set of data sources 1316 and the second set of data sources 1318 to be expandable to display more information about the sets of data sources. Moreover, the model modification system 102 can include an option selectable to restrict access by the virtual assistant, the additional virtual assistant, or other virtual assistants within the content management system to the first set of data sources 1316, one or more subsets of the first data set, the second set of data sources 1318, and/or one or more subsets of the first data set, among others.

Additionally, the model modification system 102 can determine different groupings for the data sets displayed within the virtual assistance interface 1314. For example, the model modification system 102 can group the data sets according to which virtual assistant has access to them (e.g., the virtual assistant, the additional virtual assistant, or other virtual assistants within the content management system), the source of the data set, such as data sources that are internal to the content management system or external to the content management system, a frequency of access (e.g., a first data set that is frequently accessed, as in at least once a day, week, or month, by a virtual assistant and a second data set that is not frequently accessed by a virtual assistant, such as content items that have not been accessed in over a year), or according to other factors. Indeed, by providing the virtual assistance interface 1314, the model modification system 102 improves the privacy and security of conventional systems by maintaining a record of which virtual assistants have access to which content items.

As illustrated in FIG. 13C, the model modification system 102 can generate a notification 1322 within a user interface 1320 of a client device 1300 to provide a virtual assistant access to files. For example, as discussed above with regard to FIG. 12, the model modification system 102 can determine that a virtual assistant needs access to a safeguarded content item (or that an additional virtual assistant needs access to a safeguarded content item) in order to complete a task from a prompt. Responsive to this determination (and a determination of a user account associated with/that has access control of the safeguarded content item), the model modification system 102 can generate a notification 1322 requesting the user account associated with the safeguarded content item to provide the virtual assistant and/or the additional virtual assistant access to the safeguarded content item.

Moreover, the model modification system 102 can generate the notification 1322 to include an explanation for why the virtual assistant and/or additional virtual assistant is requesting access to the content item. Moreover, the model modification system 102 can include an option in the notification 1322 to provide limited access to the safeguarded content item, such as by providing access to the safeguarded content item for a specified period of time, or only providing access to certain elements of the safeguarded content item.

Figure 13D:
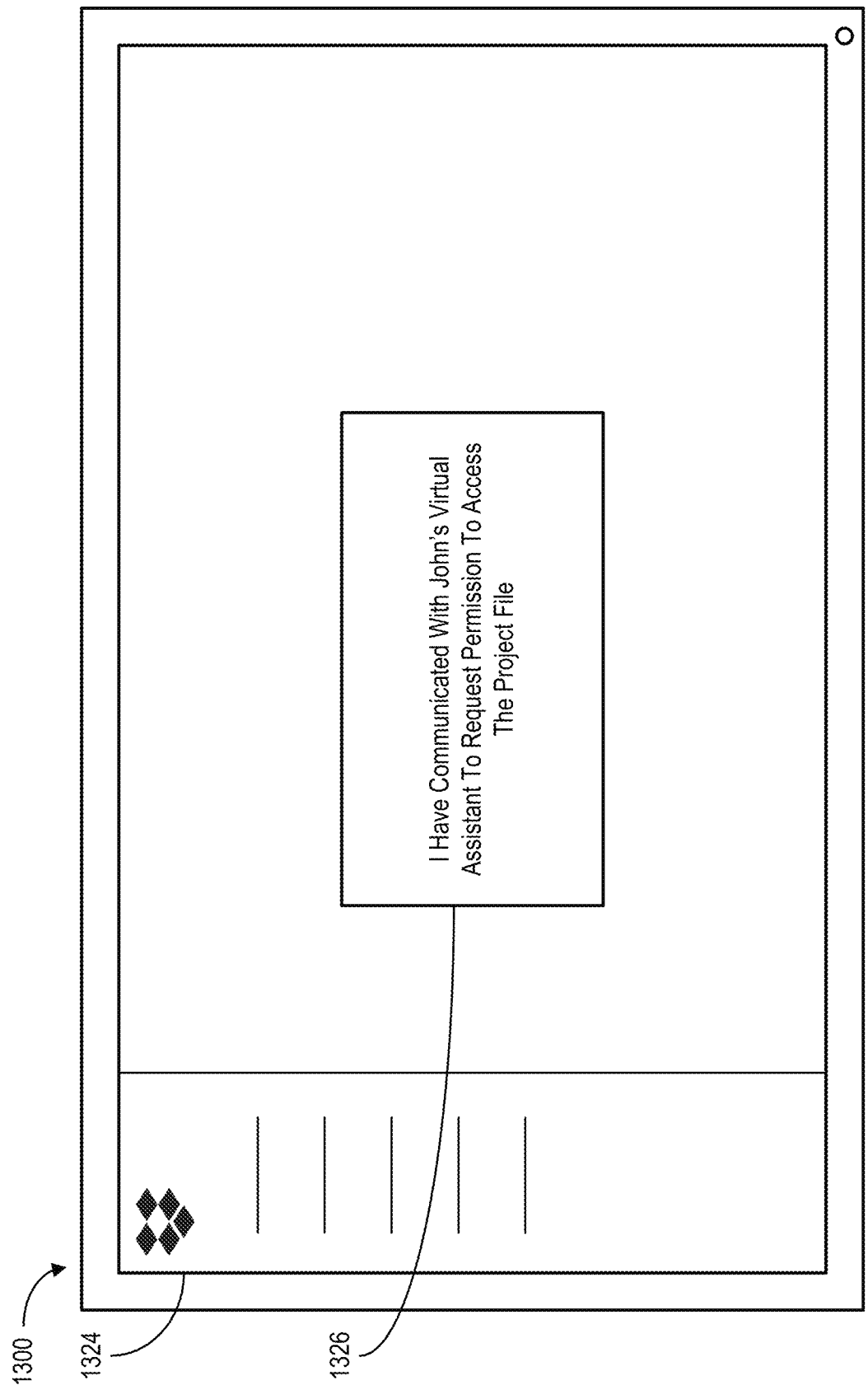

FIG. 13D illustrates the model modification system 102 generating a notification 1326 in a user interface 1324 of a client device 1300 indicating that a virtual assistant has provided an additional virtual assistant access to a project file (e.g., a safeguarded content item). Indeed, in some embodiments, the model modification system 102 can autonomously determine to provide a virtual assistant or an additional virtual assistant access to a safeguarded digital content item. For example, the model modification system 102 can determine that the safeguarded content item does not contain PII or other personal, sensitive information. Additionally, the model modification system 102 can utilize a knowledge graph to determine to grant access to the safeguarded content item to the user account.

Responsive to this determination, the model modification system 102 can generate the notification 1326 to inform a user with access control of the safeguarded content item that the model modification system 102 granted access to an additional user account. In some embodiments, the notification 1326 can include an option remove the additional user account's access to the content item.

Figure 14:
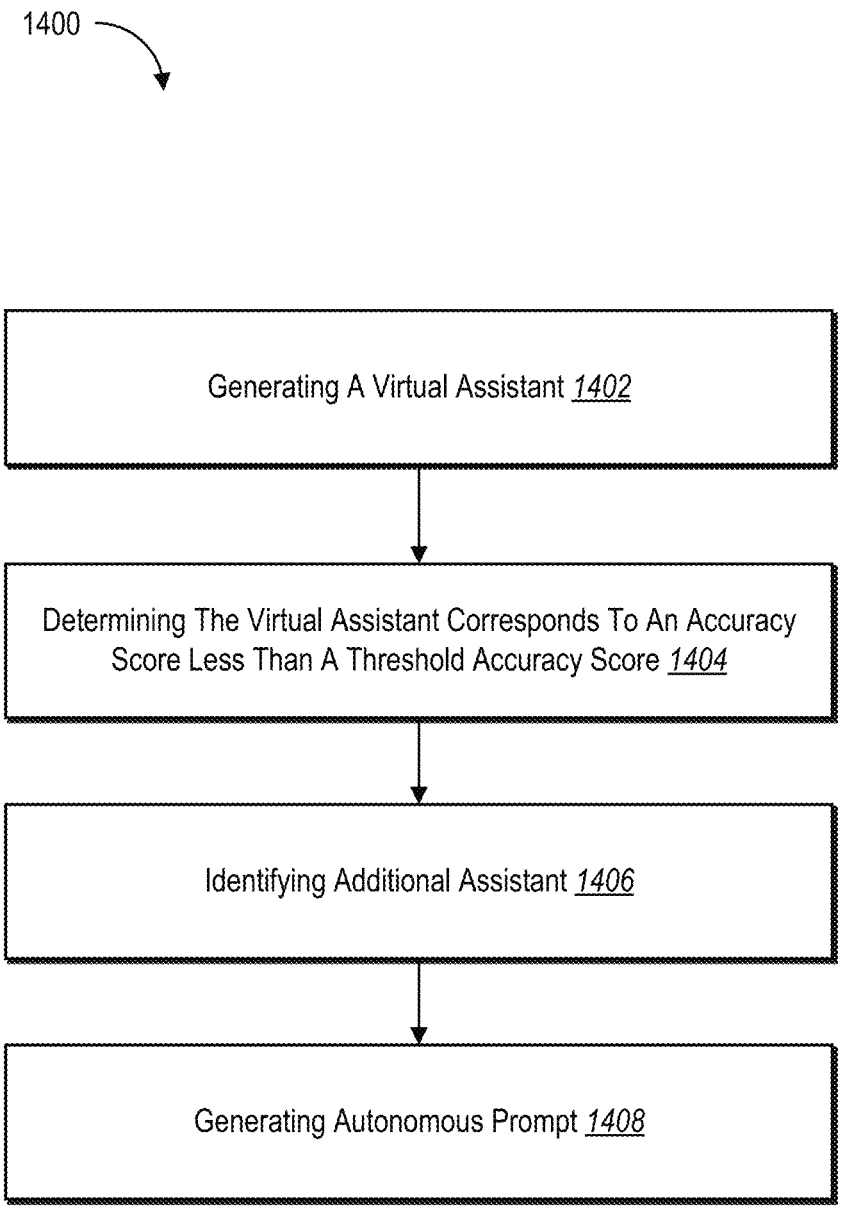
FIG. 14 illustrates an example flowchart for a series of acts for utilizing a virtual assistant to accomplish a task in accordance with one or more embodiments.

As previously mentioned, FIG. 14 shows a series of acts 1400 for utilizing a virtual assistant to accomplish a task in accordance with one or more embodiments. As illustrated in FIG. 14, the series of acts 1400 may include an act 1402 of generating a virtual assistant. In particular, the act 1402 can include generating a virtual assistant for a user account of a content management system, wherein the virtual assistant has access permission for content items associated with the user account. In addition, the series of acts 1400 can include an act 1404 of determining the virtual assistant corresponds to an accuracy score less than a threshold accuracy score. In particular, the act 1404 can include determining, by analyzing a prompt instructing the virtual assistant to perform a task, that the virtual assistant corresponds to an accuracy score less than a threshold accuracy score for performing the task. Moreover, the series of acts 1400 can include an act 1406 of identifying an additional virtual assistant. In particular, the act 1406 can include based on determining that the virtual assistant corresponds to the accuracy score less than the threshold accuracy score, identifying an additional virtual assistant within the content management system corresponding to an additional accuracy score that satisfies the threshold accuracy score. Additionally, the series of acts 1400 can include an act 1408 of generating an autonomous prompt. In particular, the act 1408 can include generating, utilizing the virtual assistant, an autonomous prompt instructing the additional virtual assistant to generate instructional data interpretable by the virtual assistant to complete the task.

Moreover, in some embodiments, the series of acts 1400 can include providing the task to the virtual assistant. Indeed, the series of acts 1400 can include completing, utilizing the virtual assistant, the task. Moreover, the series of acts 1400 can include, based on the virtual assistant completing the task, determining that the virtual assistant achieves less than the threshold accuracy score for performing the task. Additionally, the series of acts 1400 can include determining a function tag associated with the prompt and identifying, from a virtual assistant database, the virtual assistant corresponding to the function tag.

Additionally, in one or more embodiments, the series of acts 1400 can include processing, by the virtual assistant, the instructional data to execute a function to complete the task. Indeed, in some embodiments, the series of acts 1400 can include completing the task by generating a response to the prompt utilizing the virtual assistant. Moreover, in some embodiments, the series of acts 1400 can include generating a ranked list of virtual assistants according to access patterns associated with the user account. Additionally, in one or more embodiments, the series of acts 1400 can include providing, for display on a client device associated with the user account, a virtual assistant marketplace interface depicting the ranked list of virtual assistants.

Indeed, in one or more embodiments, the series of acts 1400 can include receiving, from the user account, a trait assignment for the virtual assistant. Moreover, in some embodiments, the series of acts 1400 can include generating, by the virtual assistant, the autonomous prompt according to the trait assignment.

Additionally, in one or more embodiments, the series of acts 1400 can include generate a virtual assistant for a user account of a content management system, wherein the virtual assistant has access permission for content items associated with the user account. In addition, the series of acts 1400 can include determining, at least by analyzing a prompt instructing the virtual assistant to perform a task, that the virtual assistant cannot complete the task indicated by the prompt. Moreover, the series of acts 1400 can include, based on determining that the virtual assistant cannot complete the task, identifying an additional virtual assistant within the content management system capable of completing the task. Indeed, the series of acts 1400 can include generating, utilizing the virtual assistant, an autonomous prompt instructing the additional virtual assistant to generate a response to the prompt.

Moreover, in some embodiments, the series of acts 1400 can include determining usage patterns of one or more virtual assistants accessed by additional user accounts of the content management system and identifying the additional virtual assistant according to the usage patterns. In addition, the series of acts 1400 can include determining an association between the additional virtual assistant and an additional user account. Indeed, the series of acts 1400 can include identifying, based on the association between the additional virtual assistant and the additional user account, safeguarded content items associated with the additional user account and containing data for completing the task indicated by the prompt. Additionally, the series of acts 1400 can include, based on identifying the safeguarded content items containing data for completing the task, requesting permission for the virtual assistant to access the safeguarded content items. In addition, the series of acts 1400 can include generating a response to the prompt by causing the additional virtual assistant to generate a new content item.

Moreover, in one or more embodiments, the series of acts 1400 can include identifying a first set of data sources associated with the user account accessed by the virtual assistant within the content management system. In addition, the series of acts 1400 can include identifying a second set of data sources associated with the user account accessed by the additional virtual assistant via connectors to external storage locations. Indeed, the series of acts 1400 can include generate, for display on a client device associated with the user account, a virtual assistance interface depicting the first set of data sources and the second set of data sources. Additionally, the series of acts 1400 can include determining usage patterns of the virtual assistant by the user account. Moreover, the series of acts 1400 can include determining access patterns of the content items by the user account. In addition, the series of acts 1400 can include determining a trait for the virtual assistant according to the access patterns and the usage patterns. Moreover, the series of acts 1400 can include assigning the trait to the virtual assistant for completing tasks corresponding to the trait.

Additionally, in some embodiments, the series of acts 1400 can include generating a virtual assistant for a user account of a content management system, wherein the virtual assistant has access permission for content items associated with the user account. Indeed, the series of acts 1400 can include determining, by analyzing a prompt instructing the virtual assistant to perform a task, that the virtual assistant is designated for different tasks than the task indicated by the prompt. In addition, the series of acts 1400 can include, based on determining that the virtual assistant is designated for different tasks, identifying an additional virtual assistant within the content management system designated for the task. Indeed, the series of acts 1400 can include generating, utilizing the virtual assistant, an autonomous prompt instructing the additional virtual assistant to generate a response for the prompt.

Moreover, in one or more embodiments, the series of acts 1400 can include identifying the additional virtual assistant designated for the task by comparing function tags of the additional virtual assistant with a function tag associated with the prompt. In addition, the series of acts 1400 can include generating a notification for an additional user account associated with the additional virtual assistant requesting access to the additional virtual assistant to generate the response for the prompt.

Additionally, in some embodiments, the series of acts 1400 can include determining, utilizing a knowledge graph of the content management system, relationships between the user account and additional user accounts within the content management system. Indeed, the series of acts 1400 can include generating the virtual assistant for the user account according to the relationships between the user account and the additional user accounts. Moreover, the series of acts 1400 can include identifying the additional virtual assistant according to the relationships between the user account and the additional user accounts.

In addition, in one or more embodiments, the series of acts 1400 can include determining, utilizing a knowledge graph of the content management system, relationships between the user account and additional user accounts within the content management system. Moreover, the series of acts

1400 can include determining, based on the relationships between the user account and the additional user accounts, a trait to assign to the virtual assistant. Indeed, the series of acts 1400 can include updating parameters of the virtual assistant to perform tasks corresponding to the trait. Additionally, the series of acts 1400 can include generating the response by generating a content item for the user account utilizing additional virtual assistant.

The components of the model modification system 102 can include software, hardware, or both. For example, the components of the model modification system 102 can include one or more instructions stored on a computer-readable storage medium executable by processors of one or more computing devices. When executed by one or more processors, the computer-executable instructions of the model modification system 102 can cause a computing device to perform the methods described herein. Alternatively, the components of the model modification system 102 can comprise hardware, such as a special processing device to perform a certain function or group of functions. Additionally or alternatively, the components of the model modification system 102 can include a combination of computer-executable instructions and hardware.

Furthermore, the components of the model modification system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the model modification system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
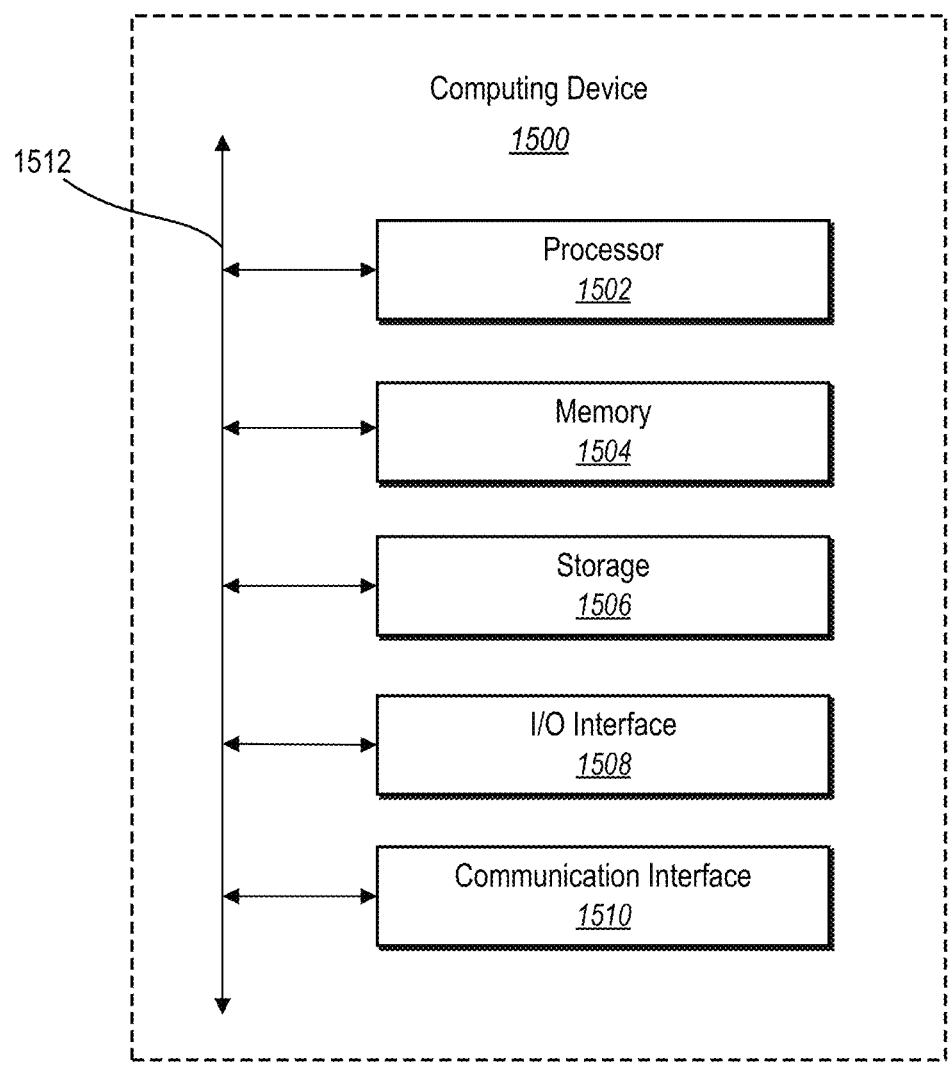
FIG. 15 illustrates a block diagram of an exemplary computing device in accordance with one or more embodiments.

FIG. 15 illustrates a block diagram of exemplary computing device 1500 (e.g., the server(s) 104 and/or the client device 108) that may be configured to perform one or more of the processes described above. One will appreciate that server(s) 104 and/or the client device 108 may comprise one or more computing devices such as computing device 1500. As shown by FIG. 15, computing device 1500 can comprise processor 1502, memory 1504, storage device 1506, I/O interface 1508, and communication interface 1510, which may be communicatively coupled by way of communication infrastructure 1512. While an exemplary computing device 1500 is shown in FIG. 15, the components illustrated in FIG. 15 are not intended to be limiting. Additional or alternative components may be used in other implementations. Furthermore, in certain implementations, computing device 1500 can include fewer components than those shown in FIG. 15. Components of computing device 1500 shown in FIG. 15 will now be described in additional detail.

In particular implementations, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage device 1506 and decode and execute them. In particular implementations, processor 1502 may include one or more internal caches for data, instructions, or addresses. As an example and not by way of limitation, processor 1502 may include one or more instruction caches, one or more data caches, and one or more translation lookaside buffers (TLBs). Instructions in the instruction caches may be copies of instructions in memory 1504 or storage device 1506.

Memory 1504 may be used for storing data, metadata, and programs for execution by the processor(s). Memory 1504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1504 may be internal or distributed memory.

Storage device 1506 includes storage for storing data or instructions. As an example and not by way of limitation, storage device 1506 can comprise a non-transitory storage medium described above. Storage device 1506 may include a hard disk drive (HDD), a floppy disk drive, flash memory, an optical disc, a magneto-optical disc, magnetic tape, or a Universal Serial Bus (USB) drive or a combination of two or more of these. Storage device 1506 may include removable or non-removable (or fixed) media, where appropriate. Storage device 1506 may be internal or external to computing device 1500. In particular implementations, storage device 1506 is non-volatile, solid-state memory. In other implementations, Storage device 1506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1508 allows a user to provide input to, receive output from, and otherwise transfer data to and receive data from computing device 1500. I/O interface 1508 may include a mouse, a keypad or a keyboard, a touch screen, a camera, an optical scanner, network interface, modem, other known I/O devices or a combination of such I/O interfaces. I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1508 is configured to provide graphical data to a display for presentation to a user. The graphical data may be representative of one or more graphical user interfaces and/or any other graphical content as may serve a particular implementation.

Communication interface 1510 can include hardware, software, or both. In any event, communication interface 1510 can provide one or more interfaces for communication (such as, for example, packet-based communication) between computing device 1500 and one or more other computing devices or networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1512 may include hardware, software, or both that couples components of computing device 1500 to each other. As an example and not by way of limitation, communication infrastructure 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 16:
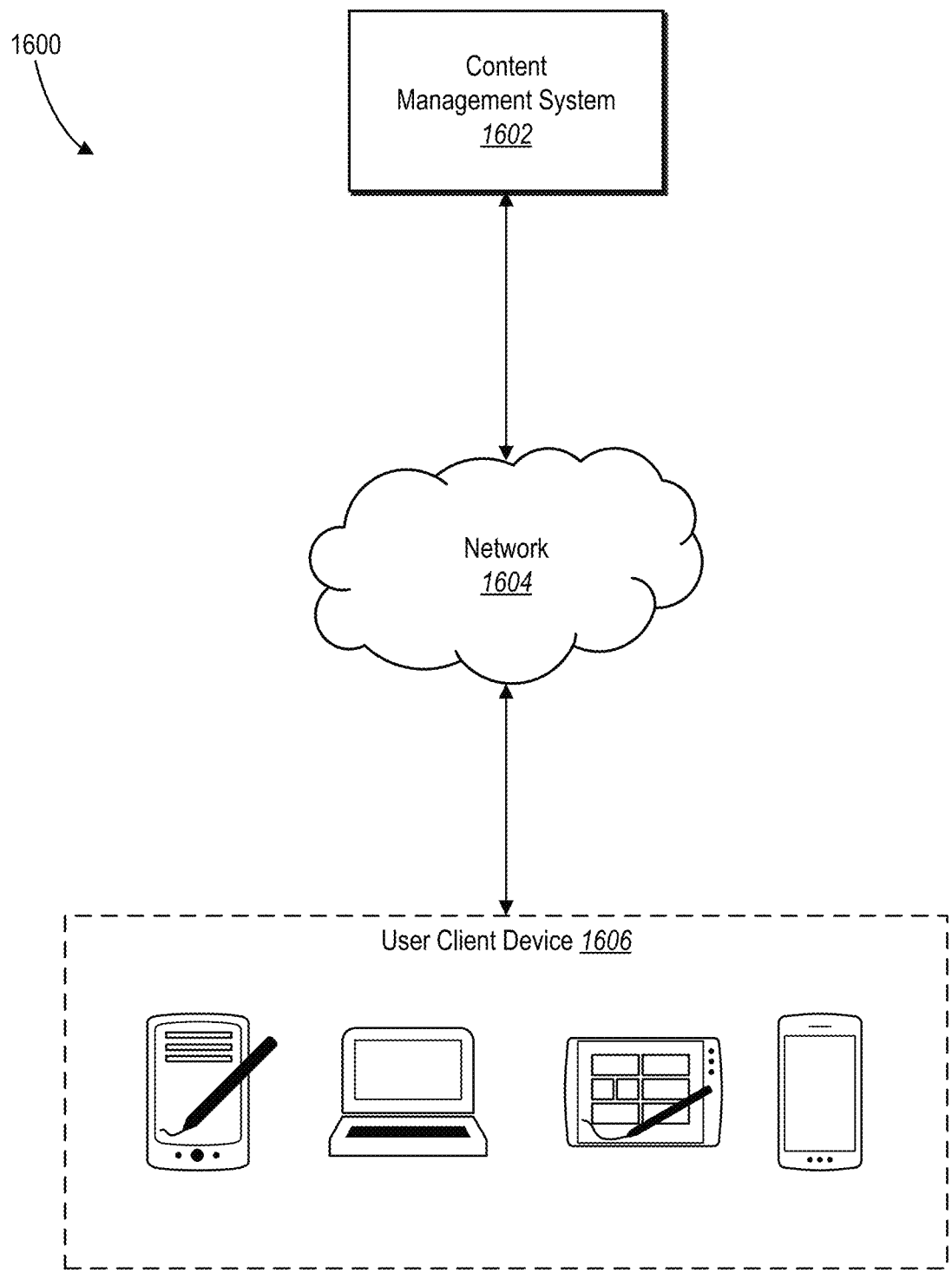
FIG. 16 illustrates an example environment of a networking system having the model modification system in accordance with one or more embodiments.

FIG. 16 is a schematic diagram illustrating environment 1600 within which one or more implementations of the model modification system 102 can be implemented. For example, the model modification system 102 may be part of a content management system 1602 (e.g., the content management system 106). Content management system 1602 may generate, store, manage, receive, and send digital content (such as digital content items). For example, content management system 1602 may send and receive digital content to and from client devices 1606 by way of network 1604. In particular, content management system 1602 can store and manage a collection of digital content. Content management system 1602 can manage the sharing of digital content between computing devices associated with a plurality of users. For instance, content management system 1602 can facilitate a user sharing a digital content with another user of content management system 1602.

In particular, content management system 1602 can manage synchronizing digital content across multiple client devices 1606 associated with one or more users. For example, a user may edit digital content using client device 1606. The content management system 1602 can cause client device 1606 to send the edited digital content to content management system 1602. Content management system 1602 then synchronizes the edited digital content on one or more additional computing devices.

In addition to synchronizing digital content across multiple devices, one or more implementations of content management system 1602 can provide an efficient storage option for users that have large collections of digital content. For example, content management system 1602 can store a collection of digital content on content management system 1602, while the client device 1606 only stores reduced-sized versions of the digital content. A user can navigate and browse the reduced-sized versions (e.g., a thumbnail of a digital image) of the digital content on client device 1606. In particular, one way in which a user can experience digital content is to browse the reduced-sized versions of the digital content on client device 1606.

Another way in which a user can experience digital content is to select a reduced-size version of digital content to request the full- or high-resolution version of digital content from content management system 1602. In particular, upon a user selecting a reduced-sized version of digital content, client device 1606 sends a request to content management system 1602 requesting the digital content associated with the reduced-sized version of the digital content. Content management system 1602 can respond to the request by sending the digital content to client device 1606. Client device 1606, upon receiving the digital content, can then present the digital content to the user. In this way, a user can have access to large collections of digital content while minimizing the amount of resources used on client device 1606.

Client device 1606 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1606 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1604.

Network 1604 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1606 may access content management system 1602.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying one or more large language models permitted to access content items stored for user accounts within a content management system;
determining, for a user account within the content management system, a large language model available to the user account from among the one or more large language models permitted to access the content items stored for the user accounts within the content management system by determining, utilizing a knowledge graph of the content management system relationships between the user accounts, wherein the knowledge graph comprises:
nodes representing the user accounts and the one or more large language models; and
edges representing relationships between the user accounts and the one or more large language models; and
based on determining the large language model available to the user account, providing a notification corresponding to the large language model for display on a client device of the user account.

2. The computer-implemented method of claim 1, wherein providing the notification corresponding to the large language model for display on the client device of the user account further comprises:
identifying a content item of the content items stored for the user accounts within the content management system to use in conjunction with the large language model.

3. The computer-implemented method of claim 1, comprising:
determining, utilizing the knowledge graph, relationships between the user accounts and the one or more large language models.

4. The computer-implemented method of claim 1, further comprising:
requesting permission for the large language model to access a content item of the content items.

5. The computer-implemented method of claim 1, further comprising:
determining one or more functionalities of the large language model; and
providing a second notification corresponding to the one or more functionalities.

6. The computer-implemented method of claim 1, wherein determining the large language model available to the user account comprises:
determining a first access pattern for a content item accessed by the user account;
determining a second access pattern for the content item accessed by an additional user account; and
determining the large language model according to a comparison of the first access pattern and the second access pattern.

7. The computer-implemented method of claim 1, further comprising determining a second large language model for the user account according to one or more interactions between the user account and the large language model.

8. A system comprising:
at least one processor; and
a non-transitory computer-readable medium storing instructions which, when executed by the at least one processor, cause the system to:
identify, within a content management system, one or more large language models authorized by user accounts to access content items stored within the content management system;
determine, for a user account within the content management system, a large language model available to the user account from among the one or more large language models permitted to access the content items stored for the user accounts within the content management system; and
provide, based on the determination of the large language model available to the user account, a notification corresponding to the large language model for display on a client device of the user account; and
generate, using the large language model, a response to a prompt by:
retrieving data from the content items stored in the content management system; and
generating the response by using the large language model to analyze the data according to the prompt.

9. The system of claim 8, further comprising instructions which, when executed by the at least one processor, cause the system to:
utilize a knowledge graph of the content management system to determine relationships between the user account and the one or more large language models utilized by the user accounts.

10. The system of claim 9, further comprising instructions which, when executed by the at least one processor, cause the system to:
generate a recommendation for the large language model from the one or more large language models to provide to the user account based on the relationships between the user account and the one or more large language models.

11. The system of claim 9, further comprising instructions which, when executed by the at least one processor, cause the system to:
determine relationships between the user account and the user accounts; and
determine the large language model according to the relationships between the user account and the user accounts.

12. The system of claim 8, further comprising instructions which, when executed by the at least one processor cause the system to:
generate the notification to identify one or more of the content items from which data is retrieved to generate the response.

13. The system of claim 8, wherein the content management system authorizes the one or more large language models to access the content items by receiving a consent indication from the user account.

14. The system of claim 8, further comprising instructions which, when executed by the at least one processor, cause the system to:
determine one or more usage patterns of the large language model by the user accounts; and
generate a second notification comprising a usage recommendation of the large language model according to the one or more usage patterns.

15. A non-transitory computer-readable medium storing executable instructions which, when executed by at least one processor, cause the at least one processor to:
- identify one or more large language models permitted to access content items stored for user accounts within a content management system;
- determine, for a user account within the content management system, a large language model available to the user account from among the one or more large language models permitted to access the content items stored for the user accounts within the content management system; and
- based on determining the large language model available to the user account, providing a notification corresponding to the large language model for display on a client device of the user account; and
- determine a second large language model for the user account according to one or more interactions between the user account and the large language model.

16. The non-transitory computer-readable medium of claim 15, further storing executable instructions which, when executed by the at least one processor, cause the at least one processor to determine the large language model available to the user account from among the one or more large language models by:
- determining, utilizing a knowledge graph of the content management system, relationships between the user account and the user accounts.

17. The non-transitory computer-readable medium of claim 16, further storing executable instructions which, when executed by the at least one processor, cause the at least one processor to:
- determine, utilizing the knowledge graph, relationships between the user accounts and the one or more large language models.

18. The non-transitory computer-readable medium of claim 15, further storing executable instructions which, when executed by the at least one processor, cause the at least one processor to:
- determine one or more functionalities of the large language model; and
- provide a second notification corresponding to the one or more functionalities.

19. The non-transitory computer-readable medium of claim 15, further storing executable instructions which, when executed by the at least one processor, cause the at least one processor to:
- determine a first access pattern for a content item accessed by the user account;
- determine a second access pattern for the content item accessed by an additional user account; and
- determine the large language model according to a comparison of the first access pattern and the second access pattern.

20. The non-transitory computer-readable medium of claim 15, further storing executable instructions which, when executed by the at least one processor, cause the at least one processor to generate the notification to identify a content item of the content items to use in conjunction with the large language model.

* * * * *